(12) United States Patent
Friedman et al.

(10) Patent No.: US 10,877,560 B2
(45) Date of Patent: Dec. 29, 2020

(54) HAPTIC FEEDBACK FOR AUTHENTICATION AND SECURITY IN COMPUTER SYSTEMS

(71) Applicant: MASTERCARD INTERNATIONAL INCORPORATED, Purchase, NY (US)

(72) Inventors: Michael Jason Friedman, Stamford, CT (US); Derek Humphreys, Lucan (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 144 days.

(21) Appl. No.: 15/852,631

(22) Filed: Dec. 22, 2017

(65) Prior Publication Data
US 2019/0196588 A1   Jun. 27, 2019

(51) Int. Cl.
*G06F 3/01* (2006.01)
*G06F 3/041* (2006.01)
(Continued)

(52) U.S. Cl.
CPC .............. *G06F 3/016* (2013.01); *G06F 3/014* (2013.01); *G06F 3/017* (2013.01); *G06F 3/0393* (2019.05);
(Continued)

(58) Field of Classification Search
CPC ...... G06F 3/016; G06F 3/0412; G06F 3/0488; G06F 2203/014; G06Q 20/382; G06Q 20/12; G06Q 30/0601
See application file for complete search history.

(56) References Cited

U.S. PATENT DOCUMENTS 6,636,833 B1   10/2003   Flitcroft et al.
7,136,835 B1   11/2006   Flitcroft et al.
(Continued)

FOREIGN PATENT DOCUMENTS

| WO | WO2007096648 A1 | 8/2007 |
| WO | WO2019118086 A1 | 6/2019 |
| WO | WO2019125621 A1 | 6/2019 |

OTHER PUBLICATIONS

Volker Roth and Kai Richter, "How to Fend Off Shoulder Surfing", published by Journal of Banking & Finance (in 2006), available online Nov. 2, 2005, and presented at 11th ACM Conference on Computer and Communications Security (Year: 2005).*
(Continued)

*Primary Examiner* — Shourjo Dasgupta
(74) *Attorney, Agent, or Firm* — Otterstedt, Wallace & Kammer, LLP

(57) ABSTRACT

An indication is obtained of interaction of a putative human user with a computing device. Responsive to the indication, presentation of a haptic pattern to the putative human user is facilitated; the pattern is not amenable to machine perception. Prompting of the putative human user to input information indicative of human perception of the pattern is facilitated. Information input by the putative human user is obtained responsive to the prompting. When the information input by the putative human user indicates that the putative human user is an actual human user, the interaction is permitted to continue. Haptic techniques are also provided for access control and/or to defend against malevolent web sites which masquerade as legitimate web sites.

16 Claims, 14 Drawing Sheets

(51) Int. Cl.
| | |
|---|---|
| *G06F 3/0488* | (2013.01) |
| *G06Q 20/38* | (2012.01) |
| *G06Q 20/12* | (2012.01) |
| *G06Q 30/06* | (2012.01) |
| *G07F 7/10* | (2006.01) |
| *G06F 3/039* | (2013.01) |
| *G06Q 20/40* | (2012.01) |
| *G06F 21/32* | (2013.01) |

(52) U.S. Cl.
CPC .......... *G06F 3/0412* (2013.01); *G06F 3/0488* (2013.01); *G06F 3/04883* (2013.01); *G06F 21/32* (2013.01); *G06Q 20/12* (2013.01); *G06Q 20/382* (2013.01); *G06Q 20/40145* (2013.01); *G06Q 30/0601* (2013.01); *G07F 7/1033* (2013.01); *G07F 7/1091* (2013.01); *G06F 2203/014* (2013.01)

(56) References Cited

U.S. PATENT DOCUMENTS

| | | | |
|---|---|---|---|
| 7,929,805 B2 | 4/2011 | Wang et al. | |
| 8,294,557 B1* | 10/2012 | El Saddik | G06F 3/016 340/407.1 |
| 8,719,952 B1* | 5/2014 | Damm-Goossens | H04L 9/0825 380/285 |
| 8,739,260 B1* | 5/2014 | Damm-Goossens | H04L 9/0891 726/7 |
| 9,767,263 B1* | 9/2017 | McInerny | G06F 21/31 |
| 2003/0098803 A1 | 5/2003 | Gourgey et al. | |
| 2006/0134586 A1 | 6/2006 | Armingaud et al. | |
| 2010/0100480 A1 | 4/2010 | Altman et al. | |
| 2011/0155044 A1 | 6/2011 | Burch et al. | |
| 2011/0251952 A1 | 10/2011 | Kelly et al. | |
| 2012/0197788 A1 | 8/2012 | Sanghvi et al. | |
| 2012/0323700 A1* | 12/2012 | Aleksandrovich | G06F 21/36 705/14.69 |
| 2013/0069772 A1 | 3/2013 | Najafi et al. | |
| 2013/0086389 A1* | 4/2013 | Suwald | G06F 21/34 713/185 |
| 2013/0160095 A1* | 6/2013 | Seleznyov | G06F 21/36 726/5 |
| 2013/0205386 A1* | 8/2013 | Thompson | G06F 21/31 726/17 |
| 2013/0290177 A1 | 10/2013 | Milam et al. | |
| 2013/0311362 A1 | 11/2013 | Milam et al. | |
| 2014/0250538 A1* | 9/2014 | Rapaport | G06F 21/31 726/28 |
| 2015/0082401 A1 | 3/2015 | Gupta et al. | |
| 2015/0242601 A1* | 8/2015 | Griffiths | G06F 21/305 726/5 |
| 2015/0248162 A1* | 9/2015 | Masson | G06F 3/016 345/173 |
| 2015/0319153 A1* | 11/2015 | Tartz | H04L 63/08 726/4 |
| 2016/0028730 A1* | 1/2016 | Natarajan | A63F 13/537 726/6 |
| 2016/0180083 A1* | 6/2016 | Costigan | G06F 21/55 726/23 |
| 2016/0224783 A1* | 8/2016 | Jakobsson | G06F 9/454 |
| 2016/0302065 A1 | 10/2016 | Bansal | |
| 2017/0090569 A1* | 3/2017 | Levesque | G06F 3/016 |
| 2017/0093864 A1* | 3/2017 | Pestun | G06F 21/31 |
| 2017/0094636 A1 | 3/2017 | Fadell et al. | |
| 2017/0163647 A1* | 6/2017 | Cernoch | H04L 63/105 |
| 2017/0178272 A1 | 6/2017 | Lashkari et al. | |
| 2017/0249794 A1* | 8/2017 | Davis | G07C 9/00309 |
| 2019/0187859 A1 | 6/2019 | Friedman et al. | |
| 2019/0377417 A1 | 12/2019 | Friedman et al. | |

OTHER PUBLICATIONS

VRgluv, LLC, VRgluv—Force Feedback Haptic Gloves for VR, pp. 1-5, downloaded Oct. 18, 2017, www.vrgluv.com.
VRgluv, LLC, VRgluv—Force Feedback Gloves for Virtual Reality, pp. 1-10, downloaded Dec. 9, 2017, www.vrgluv.com.
Virtuix, Virtuix Omni first of its kind active virtual reality motion platform, pp. 1-3 downloaded Oct. 18, 2017 from www.virtuix.com/.
Tactai, Introducing Tactai Touch, downloaded Jul. 18, 2017 from http://tactai.com/, pp. 1-3.
Google, reCAPTCHA: Easy on Humans, Hard on Bots, downloaded Jul. 18, 2017 from https://www.google.com/recaptcha/intro/, pp. 1-7.
Mastercard International Incorporated, MasterCard in Control™ is the perfect tool for you to stay protected, p. 1, Downloaded Aug. 18, 2017 From www.mastercard.com.
Digital Trends, Manus VR gloves let you reach out and touch the future _ Digital Trends, by Will Fulton—Posted on Mar. 24, 2016, downloaded Oct. 18, 2017 from https://www.digitaltrends.com/virtual-reality/manus-vr-gloves-hands-in/, pp. 1-5.
Manus VR, Manus VR _ The Pinnacle of Virtual Reality Controllers_, pp. 1-4, downloaded Dec. 9, 2017 from manus-vr.com/.
Wikipedia, Haptic technology, downloaded May 24, 2017 from https://en.wikipedia.org/wiki/Haptic_technology, pp. 1-12.
Glider Gloves _ #1 Rated Touch Screen Gloves on the Planet, pp. 1-7 downloaded Dec. 8, 2017 from https://www.glidergloves.com/.
Virtuix, E3 and Omni Cable _ Virtuix Omni, pp. 1-7 downloaded Dec. 9, 2017 from www.virtuix.com/.
Manus VR, Product Information Datasheet, Development Kit—Version 1.1—Apr. 2017, pp. 1-5, downloaded Dec. 9, 2017 from www.manus-vr.com.
Peter Mell and Timothy Grance, The NIST Definition of Cloud Computing, NIST Special Publication 800-145, Sep. 2011, cover, pp. i-iii and 1-3.
Catherine A. Todd et al., An Audio Haptic Tool for Visually Impaired Web Users, J. Emerging Trends in Computing Information Sciences, v. 3 n. 8, Aug. 2012 pp. 1136-1145.
Wikipedia, Microsoft HoloLens, pp. 1-9, Downloaded Mar. 27, 2018 https://en.wikipedia.org/wiki/Microsoft_HoloLens, page was last edited on Mar. 9, 2018.
Wikipedia, Kinect, Downlaoded Jan. 26, 2018 From https://en.wikipedia.org/wiki/Kinect, p. 1-20, page was last edited on Jan. 12, 2018.
Wikipedia, CAPTCHA, pp. 1-8 Downloaded Sep. 3, 2017 From https://en.wikipedia.org/wiki/CAPTCHA.
Wikipedia, reCAPTCHA, pp. 1-6 Downloaded Sep. 3, 2017 From https://en.wikipedia.org/wiki/ReCAPTCHA.
Educational System Federal Credit Union, Online Banking Login Instructions, pp. 1-4, Downloaded Sep. 3, 2017 From www.esfcu.org.
Android Apps on Google Play, Pattern Lock Screen, Downloaded Sep. 3, 2017 From https://play.google.com/store/apps, pp. 1-3, Last Updated Mar. 9, 2017.
Authorized Officer Sang Bum Chin, Korean IP Office, Written Opinion of the ISR, PCT Appln PCT/US2018/059332, dated Mar. 4, 2019, pp. 1-13.

\* cited by examiner

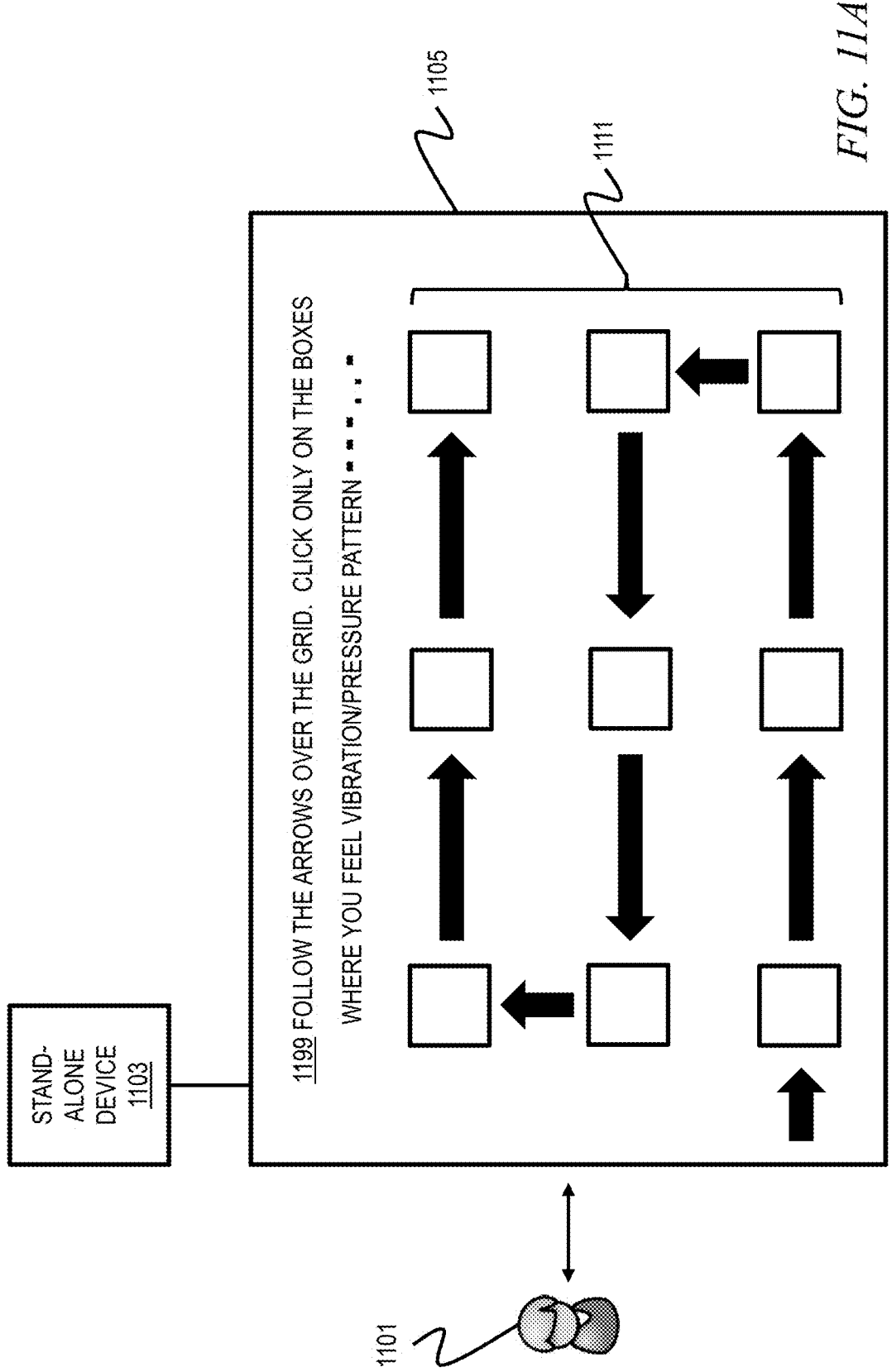

HAPTIC FEEDBACK FOR AUTHENTICATION AND SECURITY IN COMPUTER SYSTEMS

FIELD OF THE INVENTION

The present invention relates generally to the use of haptic technology in the electronic and computer arts, and, more particularly, but not exclusively, to use of haptic technology and/or related stimuli in authentication, security, and/or challenge response tests to determine that a computer user is human, and the like.

BACKGROUND OF THE INVENTION

Haptic communication recreates the sense of touch by applying forces, vibrations, and/or motions to a user. Uses include assistance in the creation of virtual objects in a computer simulation, control of such virtual objects, and enhancement of the remote control of machines and devices. Haptic devices may incorporate tactile sensors that measure forces exerted by the user on the interface.

In virtual reality systems, haptics add the sense of touch to previous visual-only interfaces. Haptics may be useful for those who are visually impaired, but can also provide an enhanced user experience for those having unimpaired vision.

A CAPTCHA (Completely Automated Public Turing test to tell Computers and Humans Apart) is a type of challenge-response test used in computing to determine whether the user is human. The user must type the letters of a distorted image, sometimes with the addition of an obscured sequence of letters or digits that appears on the screen. The so-called reCAPTCHA is a CAPTCHA-like system designed to establish that a computer user is human (normally in order to protect websites from malicious bots (bots are applications that perform an automated task)) and, at the same time, assist in the digitization of books. CAPTCHA and reCAPTCHA type systems may be difficult for those with visual impairment or other disabilities such as dyslexia.

Currently, when individuals sign up for online banking or the like, they may choose an image and/or phrase that will appear when they log on to the online banking site; this is to help ensure that the individual has logged onto the genuine web site. This process may also be problematic for the disabled.

SUMMARY OF THE INVENTION

Principles of the present invention provide techniques for haptic feedback as a method of authentication for e-commerce. In one aspect, an exemplary method, according to an aspect of the invention, includes obtaining an indication of interaction of a putative human user with a computing device; responsive to the indication, facilitating presentation to the putative human user of a haptic pattern not amenable to machine perception; facilitating the putative human user being prompted to input information indicative of human perception of the pattern; obtaining information input by the putative human user responsive to the prompting; and, when the information input by the putative human user indicates that the putative human user is an actual human user, permitting the interaction to continue.

In another aspect, another exemplary method, according to another aspect of the invention, includes, during user registration of a user for a web site associated with an expected host server, indicating to a user a predetermined haptic pattern which will be presented to the user during future access to the web site; during the future access to the web site, presenting the predetermined haptic pattern to the user, so that the user can verify that the pattern matches the indication from the registration and can have confidence that web pages the user is interacting with are sourced from the expected host server; and, subsequent to the presenting of the predetermined pattern to the user, the expected host server interacting with the user to facilitate an online transaction.

In still another aspect, still another exemplary method, according to still another aspect of the invention, includes pre-establishing a shared secret with an authorized person for control of access to a resource, the shared secret including a haptic pattern; obtaining an indication of a person purporting to be the authorized person attempting to access the resource; responsive to the indication, facilitating the person purporting to be the authorized person being prompted to input to a processor information indicating that the person purporting to be the authorized person is in possession of the shared secret; obtaining input from the person purporting to be the authorized person responsive to the prompting; and, when the input from the person purporting to be the authorized person indicates that the person purporting to be the authorized person is in possession of the shared secret, permitting the person purporting to be the authorized person to access the resource.

Aspects of the invention contemplate the method(s) described herein performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps (e.g., when instructions from a persistent storage device are loaded into the memory to configure the processor). Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the invention can provide substantial beneficial technical effects, such as:

increasing ability for the visually impaired and/or those with other disabilities such as dyslexia to prove to a web site that they are human;

increasing ability for the visually impaired and/or those with other disabilities such as dyslexia to feel comfortable that they have logged on to a legitimate web site for online banking or the like; and/or enhanced security to prevent unauthorized site access by automated "bots" (so-called bots are becoming able to circumvent current security features such as CAPT-CHA programs with distorted texts that resist machine reading and reCAPTCHA programs requiring identification of fragments of street signs).

These and other features and advantages of the present invention will become apparent from the following detailed description of illustrative embodiments thereof, which is to be read in connection with the accompanying drawings.

BRIEF DESCRIPTION OF THE DRAWINGS

FIGS. 11A and 11B (collectively, FIG. 11) depicts a stand-alone arrangement useful in connection with haptic authentication, according to an aspect of the invention;

DETAILED DESCRIPTION OF PREFERRED EMBODIMENTS

One or more embodiments are applicable in a variety of contexts; in cases where it is desired to verify that a computer user is human and not a so-called "bot"; where it is desired to make a user feel confident that he or she has navigated to the desired legitimate web site; for shared-secret authentication; access control; and the like. Applications include, but are not limited to, e-commerce. A detailed description of a modern payment card processing network is provided herein, it being understood that this is but one non-limiting exemplary application of aspects of the invention. In some instances, techniques described herein are used in lieu of, or in addition to, the personal identification number (PIN) authentication for so-called "chip and PIN" transactions (e.g., with an e-wallet on a "smart" mobile phone). Embodiments can be employed whenever it is desired to verify that a computer user is human; interactions with a payment card processing network are but one non-limiting example. Thus, it should be kept in mind that the following description of payment devices and associated payment processing networks is a non-limiting example provided for the skilled artisan, and that one or more embodiments have many other applications; for example a case where an unauthorized bot attempts to "scrape" a web site for nefarious purposes such as a denial of service attack or the like, or an attempt to gain access by trying multiple passwords.

Payment Devices and Associated Payment Processing Networks

Figure 1:
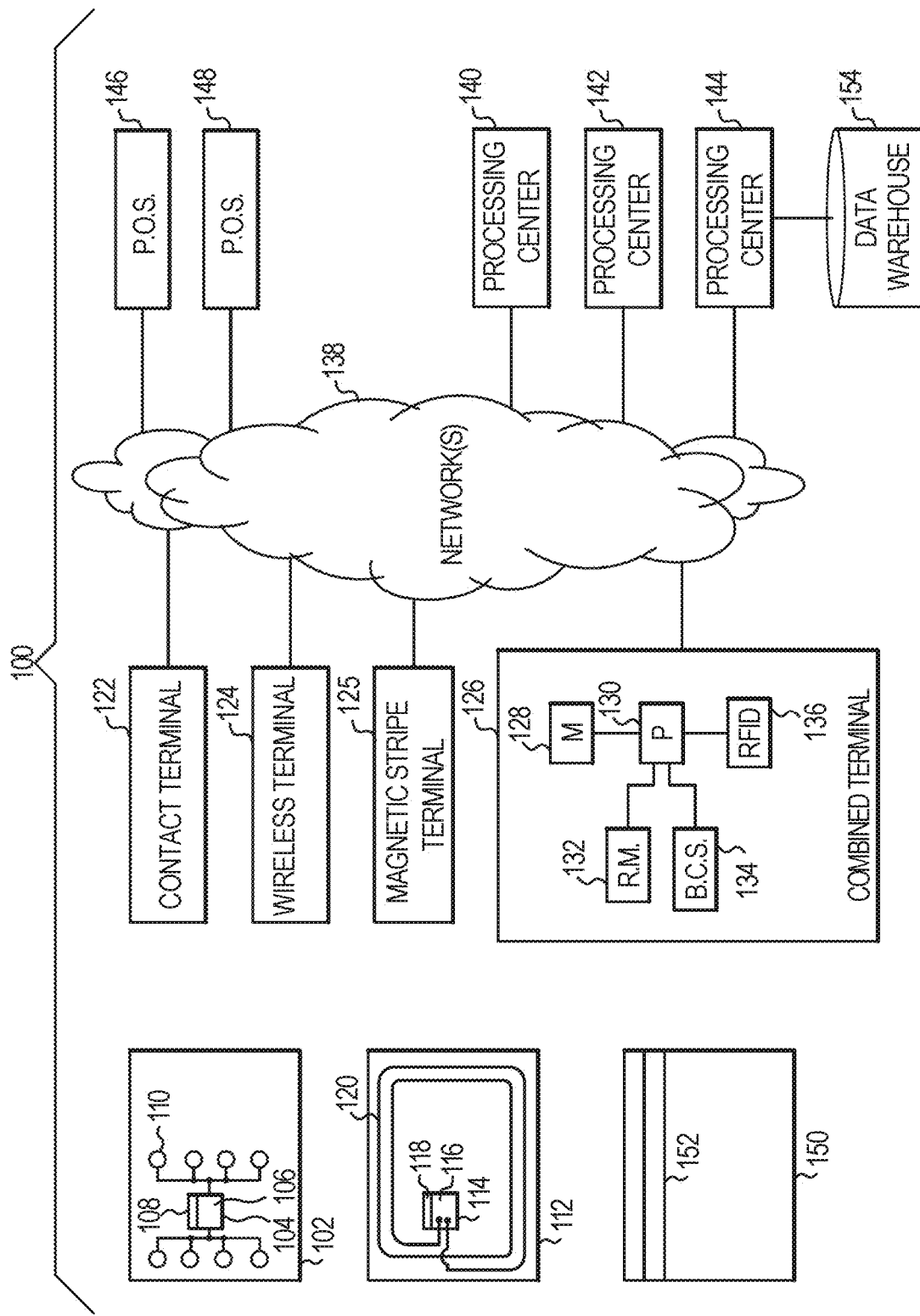
FIG. 1 shows an example of a system and various components thereof that can implement at least a portion of some techniques of the invention.

With regard to payment card and similar payments, attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system 100 typically functions with other types of devices in lieu of or in addition to "smart" or "chip" cards 102, 112; for example, a conventional card 150 having a magnetic stripe 152. Furthermore, an appropriately configured mobile device (e.g., "smart" cellular telephone handset, tablet, personal digital assistant (PDA), and the like) can be used to carry out contactless payments in some instances; for example, via near field communications (NFC), wherein the appropriately configured mobile device acts like a contactless card 112 (or, with an electronic wallet present, like multiple such cards).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions of units 108, 118 can store the operating system of the cards 102, 112. The operating system loads and executes applications and provides file management or other basic card services to the applications. One operating system that can be used is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

The skilled artisan will also be familiar with the Master-Card® Contactless specifications (the skilled artisan will appreciate that MASTERCARD CONTACTLESS was formerly known as MASTERCARD PAYPASS), available under license from MasterCard International Incorporated of Purchase, N.Y., USA (marks of MasterCard International Incorporated of Purchase, N.Y., USA).

As noted, cards 102, 112 are examples of a variety of payment devices that can be employed. The primary function of the payment devices may not be payment, for example, they may be cellular phone handsets that implement appropriate techniques. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment or the like. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone, tablet, or the like.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 150. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can optionally be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

It should be noted that the system depicted in FIG. 1 may involve not only conventional transactions at "brick and mortar" merchants, but also, card-not-present transactions, such as card-not-present Internet transactions or card-not-present recurring payments. In some instances, an Internet Protocol (IP) address may be captured during card-not-present Internet transactions. In exemplary card-not-present Internet transactions, an individual utilizes his or her home computer to communicate with a server of an e-commerce merchant over the Internet. The individual provides his or her PAN to the merchant's server. The merchant utilizes the PAN to initiate an authorization request, and upon receiving an authorization request response indicating approval, will complete the e-commerce transaction. In exemplary card-not-present recurring payments, an individual provides his or her PAN and related data to a merchant (e.g., via phone or postal mail). The merchant utilizes the PAN to initiate an authorization request, and upon receiving an authorization request response indicating approval, will complete the recurring transaction. It should be noted that one or more embodiments are applicable to both token-based transactions (see, e.g., "EMV® Payment Tokenisation Specification: Technical Framework," Version 1.0, March 2014, EMVCo, LLC ("EMVCo"), expressly incorporated herein by reference in its entirety for all purposes) and PAN-based transactions.

In some cases, there can be payment card accounts which do not have physical cards or other physical payment devices associated therewith; for example, a customer can be provided with a PAN, expiration date, and security code but no physical payment device, and use same, for example, for card-not-present telephone or internet transactions. In this regard, a "cardholder" should be understood to refer to the account holder of a payment card account, regardless of whether the holder actually has a physical payment card or other physical payment device.

Figure 2:
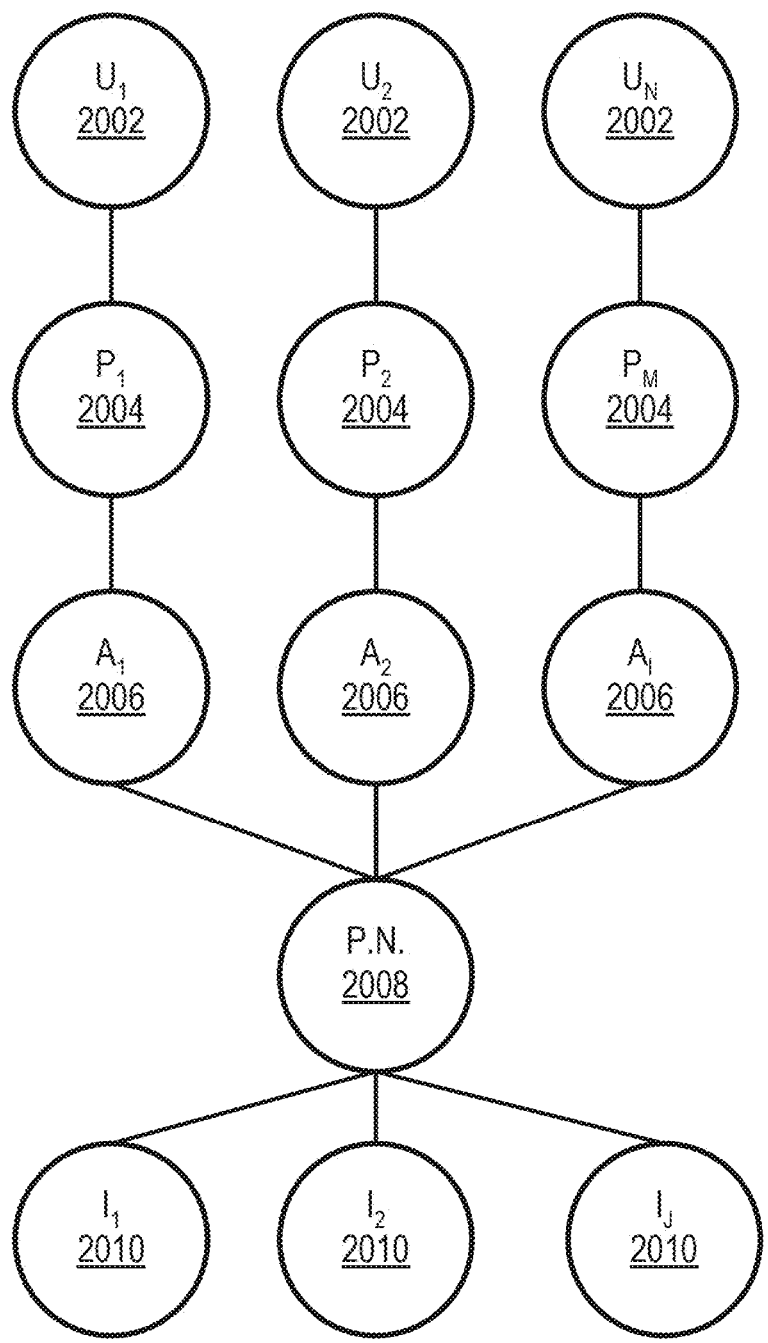
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers, useful in connection with one or more embodiments of the invention.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal. Note also that elements 2006, 2010 represent the entities that actually carry out processing for the acquirers and issuers respectively; in some instances, these entities carry out their own processing; in other entities, they utilize acquirer processors and issuer processors, respectively.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed in relation to payment card accounts using other kinds of payment networks, for example, proprietary or closed payments networks with only a single issuer and acquirer. Furthermore in this regard, FIG. 2 depicts a four party model, as will be known to the skilled artisan; the four parties are the consumer 2002, merchant 2004, acquirer 2006, and issuer 2010. However, at least some embodiments are also of use with three-party models, wherein the acquirer and issuer are the same entity.

Messages within a network such as network 138 and/or network 2008, may, in at least some instances, conform to the International Organization for Standardization (ISO) Standard 8583, *Financial transaction card originated messages—Interchange message specifications*, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)

ISO 8583 Part 2: Application and registration procedures for Institution Identification Codes (IIC) (1998)

ISO 8583 Part 3: Maintenance procedures for messages, data elements and code values (2003)

ISO 8583:1993 (1993)

ISO 8583:1987 (1987)

As used herein, a "payment card network" is a communications network that uses payment card account numbers, such as primary account numbers (PANs), to authorize, and to facilitate clearing and settlement of, payment card transactions for credit, debit, stored value and/or prepaid card accounts. The card accounts have standardized payment card account numbers associated with them, which allow for efficient routing and clearing of transactions; for example, ISO standard account numbers such as ISO/IEC 7812-compliant account numbers. The card accounts and/or account numbers may or may not have physical cards or other physical payment devices associated with them. For example, in some instances, organizations have purchasing or procurement card accounts to which a payment card account number is assigned, used for making purchases for the organization, but there is no corresponding physical card. In other instances, "virtual" account numbers are employed; this is also known as PAN mapping. The PAN mapping process involves taking the original Primary Account Number (PAN) (which may or may not be associated with a physical card) and issuing a pseudo-PAN (or virtual card number) in its place. Commercially available PAN-mapping solutions include those available from Orbiscom Ltd., Block 1, Blackrock Business Park, Carysfort Avenue, Blackrock, Co. Dublin, Ireland (now part of MasterCard International Incorporated of Purchase, N.Y., USA); by way of example and not limitation, techniques of U.S. Pat. Nos. 6,636,833 and 7,136,835 of Flitcroft et al., the complete disclosures of both of which are expressly incorporated herein by reference in their entireties for all purposes.

Some payment card networks connect multiple issuers with multiple acquirers; others use a three party model. Some payment card networks use ISO 8583 messaging. Non-limiting examples of payment card networks that connect multiple issuers with multiple acquirers are the BANKNET® network and the VISANET® network. One or more embodiments are applicable to many other different kinds of payment card networks as well; the AMERICAN EXPRESS® network and the DISCOVER® network are non-limiting examples.

Figure 4:
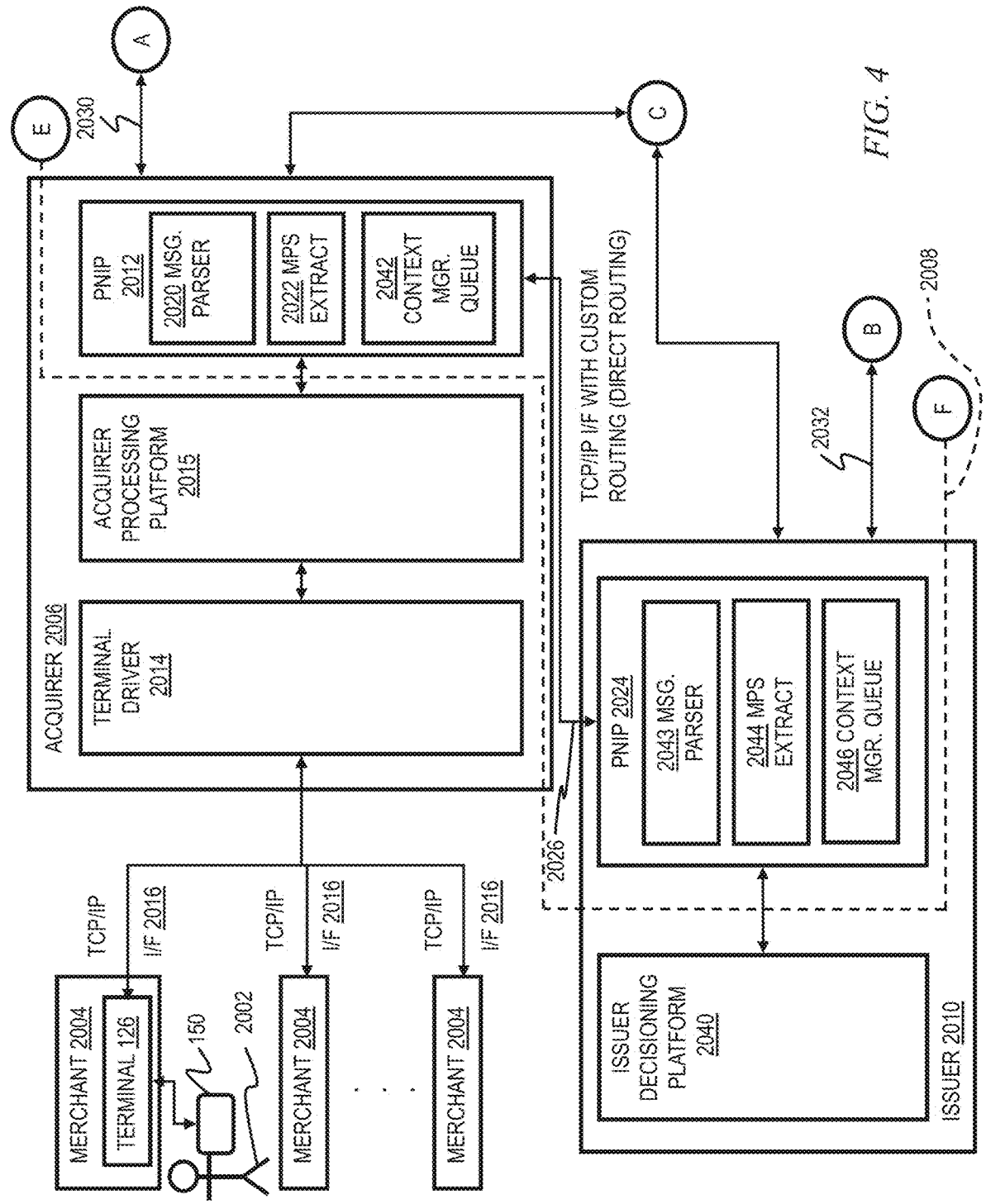
FIGS. 4 and 5 provide an exemplary detailed view of operation of a payment card network, in accordance with an aspect of the disclosure.
Figure 5:
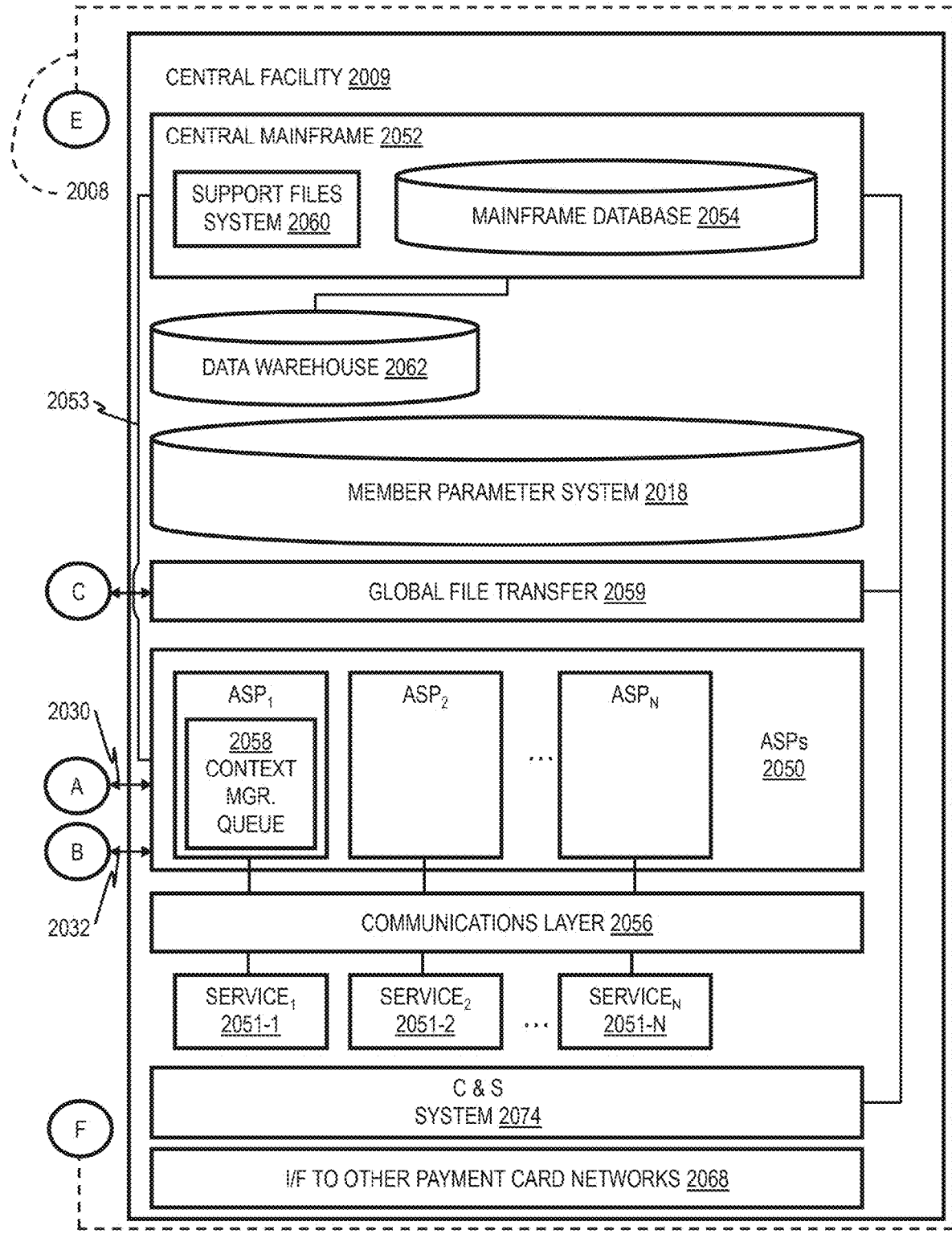

Still referring to FIG. 2, and with reference also now to FIGS. 4 and 5, by way of review and provision of additional detail, a consumer 2002 effectively presents his or her card 150 or other payment device (e.g., presents suitably configured "smart" phone or uses an e-wallet) to the terminal 126 of a merchant 2004. A mag stripe card 150 and combined terminal 126 are shown by way of example, but are intended to generally represent any kind of payment device and any kind of terminal. The effective presentation can happen directly (user enters a brick and mortar location of a merchant 2004) or virtually (user logs on to a web site of a merchant 2004 via a browser of a personal computer or the like, or calls on the telephone, and provides card information, or sends a "snail" mail with payment card account information to a merchant). The merchant terminal 126 captures the card account information (for example, by swiping or wireless communication if directly presented; by manual keying or reading data if remote) and forwards same to the acquirer 2006. Interaction between the merchant and cardholder is outside the purview of the payment card network per se. The payment card network becomes involved at the connection between the acquirer 2006 and network 2008; the dotted line between points E and F in FIGS. 4 and 5 encompasses the network 2008. Note generally that points A, B, C, E, and F in FIG. 4 connect to the corresponding points in FIG. 5; the entire network and associated environment are not amenable to illustration on a single sheet.

More specifically, the acquirer 2006, in the more specific example of FIGS. 4 and 5, has at its premises a payment network interface processor (PNIP 2012). The MasterCard Interface Processor or MIP is a non-limiting example of a PNIP. In a non-limiting example, the PNIP is implemented on a rack-mounted server. PNIPs are typically located at the edges of the payment card network. In at least some instances, the payment card network of FIG. 2 is a distributed network wherein each acquirer and issuer has at least one PNIP on their premises. Each acquirer 2006 will have a relationship with one or more merchants 2004 and will interface with the merchants' terminals 126 via terminal driver 2014 (an acquirer may also act as an acquirer for themselves as a merchant). Furthermore in this regard, the merchant locations will have terminals where the cards are swiped (or where contacted or contactless devices are presented). The acquirer will employ terminal driver 2014 to interface with those terminals. Terminal driver 2014 is a logical block representing software and/or hardware that allows the acquirer processing platform 2015 to communicate with the terminals of the merchants via TCP, dial up, or the like (TCP/IP interfaces 2016 are shown in the example in the figures). Each merchant will decide what acquirer to use to accept one or more brands of payment cards, and the acquirer will set the merchant up with the appropriate software and/or firmware for the merchant's point of sale devices.

The acquirer 2006 will present transactions from many different merchants 2004 to the payment card network operator 2008 via the PNIP interface 2012. The connection between the merchants 2004 and the acquirer 2006 is typically a TCP/IP interface 2016. The format that the transaction is in when the card is swiped at the merchant 2004 may differ from the format that the transaction is in when actually received by the payment card network operator. The acquirer may convert the transaction into the ISO 8583 format or into a format that is a specific implementation of the ISO 8583 format (e.g., the MASTERCARD CIS (customer interface specification) format). The authorization request message can be an ISO 8583 message type identifier (MTI) 0100 message, for example, sent over the communications interface 2016 between the merchant 2004 and the acquirer 2006.

Once the 0100 message is received at the PNIP 2012 of the acquirer 2006, a series of edits can be performed on the transaction with respect to format, content, and/or context. Furthermore, screening can be carried out to determine whether the message relates to something beyond an ordinary authorization request, referred to as an enhanced service. Enhanced services may be screened for on behalf of one or more issuers 2010 and/or the operator of network 2008 itself. A centralized member parameter system (MPS) 2018 can be provided to house parameters used to drive processing of credit authorization transactions. In one or more embodiments, extracts from the centralized member parameter system 2018 are distributed to all acquirer PNIPs 2012 and issuer PNIPs 2024 on the network 2008 on a daily basis to drive processing of credit card transactions.

It should be noted at this point that an "ICA" and a "BIN" are employed in BANKNET so that a member can perform card issuing and/or acquiring activities. An ICA or Interbank Card Association is a four to six digit identification assigned by MasterCard for use by a member to uniquely identify activity the member is responsible for. A BIN or Bank Identification Number is a unique series of numbers assigned by MasterCard to a principal member and used as the first six digits of a cardholder account number. Other payment card networks have similar types of numbers, as will be apparent to the skilled artisan.

Figure 7:
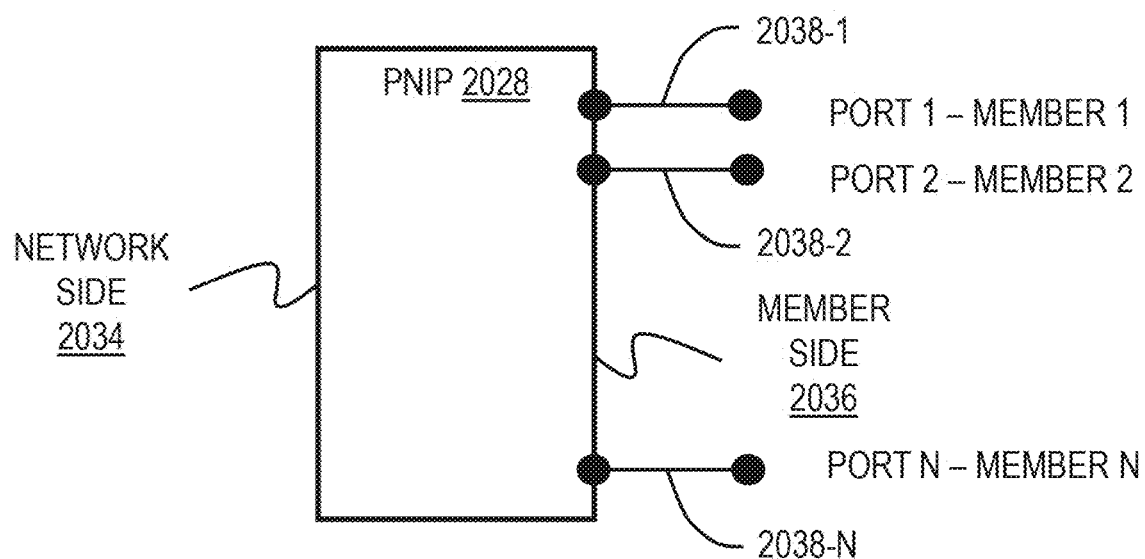
FIG. 7 shows a port arrangement on a payment network interface processor, such as may be used with the network of FIGS. 4 and 5.

In at least some embodiments, the same member parameter extract is sent to all PNIPs and transactions are routed using same. In at least some circumstances, account numbers or ranges of account numbers are used in deciding how to route. In some cases, transactions are routed to an issuer PNIP based on where the account range is "signed in." Issuers send an MTI 0800 sign in request message with either a group ID or account range. The Member ID is pulled from the PNIP port 2038 (discussed elsewhere herein) configuration and transactions from that account range are then routed to the port from which the sign-in request is received. A member ID can be present on ports on multiple PNIPs at an Issuer site—see discussion of FIG. 7 below.

In one or more embodiments, based on the account range, the parameters in MPS 2018 (or a local extract thereof) will determine how to process a given transaction; e.g., product code, country code, currency code, and the like, including what enhanced services (if any) the issuer has signed up for on a particular account range. That is to say, the messages are parsed and certain fields, including the account range, are examined; the account range is associated with a certain issuer and based on that, the message may be treated differently. Messages may be parsed, and converted into an internal data format so that access can be obtained to all the individual data elements. In one or more embodiments, the account number is used as a key to access the MPS 2018 (or a local extract thereof) and retrieve all the parameters that are appropriate for processing the given transaction. In a non-limiting example, a suitable message parser 2020 (and other programs on the PNIP 2012) can be written in an appropriate high-level language or the like.

In an exemplary embodiment, the central MPS 2018 creates extracts once a day that are distributed out to the endpoints on the network (e.g., PNIPs 2012), as seen at 2022. These extracts include the pertinent information needed for the PNIP to process the message and determine if it requires any special handling. In some instances, messages are next routed to a central site 2009 for performance of enhanced services. On the other hand, if no special services are required, the message may be routed directly to the issuer PNIP 2024 as seen at 2026.

Messages routed directly to the issuer PNIP: In this aspect, the transaction is routed directly to the issuer PNIP 2024 based on the MPS extract 2022, as seen at 2026. Every account range will have a unique destination endpoint identified in the parameters (account ranges may be grouped and all members of the account range group may have a common destination endpoint). The member interface refers to the connection between the acquirer processor 2006 and the Acquirer PNIP 2012. This term also applies to the interface between the Issuer PNIP 2024 and issuer processor 2010. The connections between and among acquirer PNIP 2012 and issuer PNIP 2024, acquirer PNIP 2012 and ASPs 2050 (discussed elsewhere herein), and ASPs 2050 and issuer PNIP 2024 are referred to as a network interface onto the payment card network itself. In one or more embodiments, this may be a TCP/IP connection (as seen at 2026) with customized routing capabilities including group addresses. Normally, TCP/IP addresses refer to a single endpoint. Group addresses may be directed to a group of addresses, and will target any of the computers (e.g., PNIPs) in the group using a variety of protocols. Some use a round robin approach; others may use a first in list approach where the message is always routed to one given computer first and then to a second computer only if the first is not available. Group addressing may be useful, for example, where an acquirer or issuer has multiple PNIPS at the same location for redundancy/fault tolerance. It is also possible to combine the approach and institute a round robin, wherein the addresses within the round robin are first in list group address, or conversely, it is possible to institute a first-in-list, wherein the addresses within the first-in-list are round robin group addresses. These capabilities are useful in case of outages, maintenance, and the like.

Figure 6:
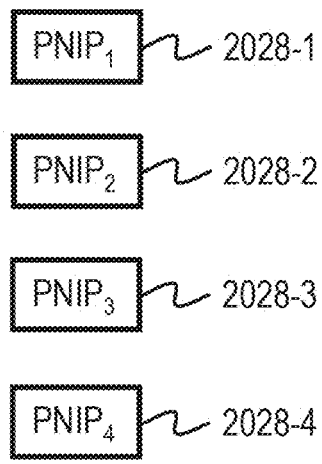
FIG. 6 shows a group of payment network interface processors, such as may be used with the network of FIGS. 4 and 5.
Figure 9:
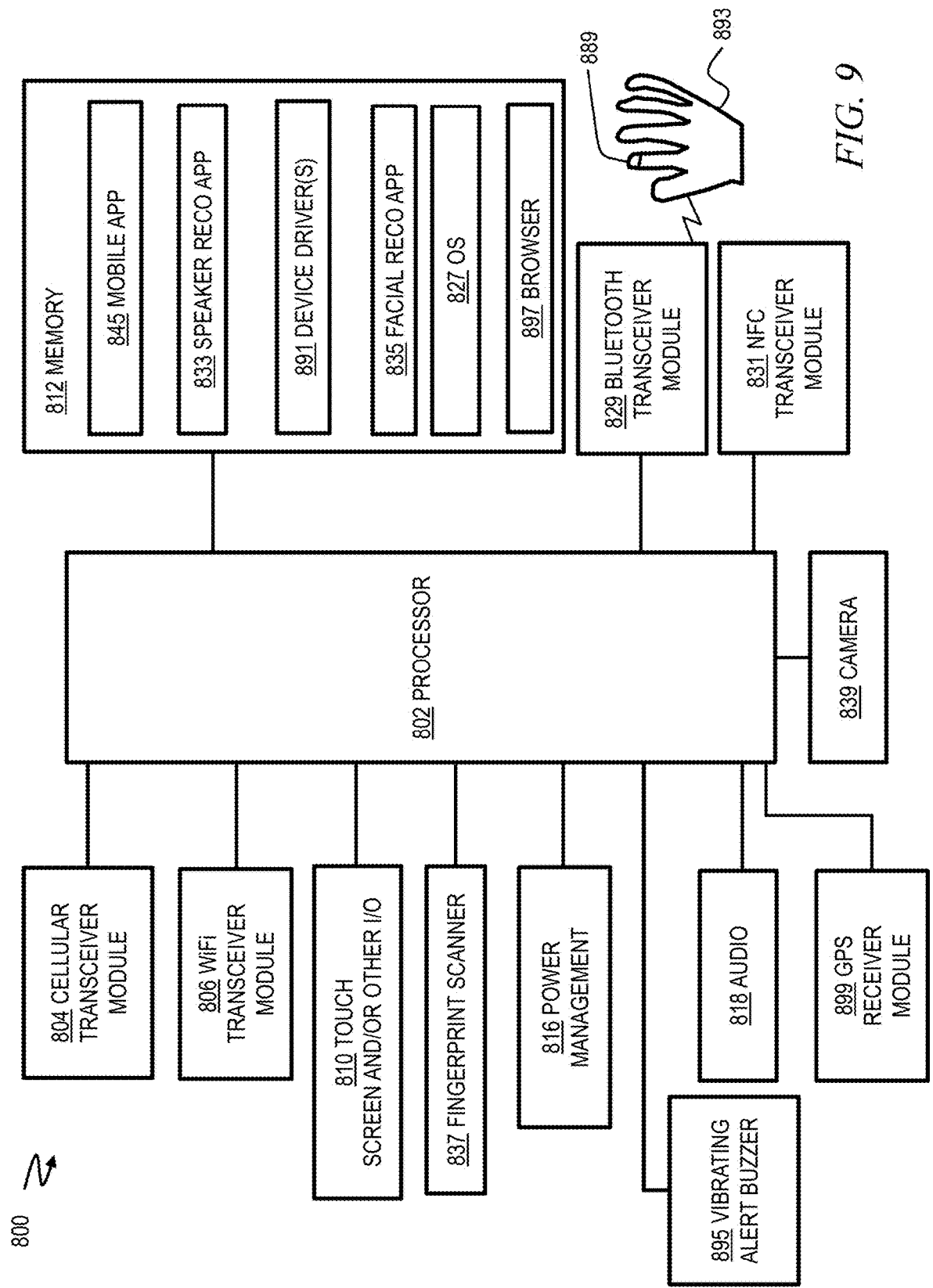
FIG. 9 is a block diagram of a "smart" phone or tablet computer interfacing with a haptic glove, according to an aspect of the invention.

FIG. 6 shows a non-limiting example with four PNIPs 2028-1 through 2028-4. In a round robin approach, a first message is routed first to PNIP 2028-1, a second message to PNIP 2028-2, a third message to PNIP 2028-3, a fourth message to PNIP 2028-4, a fifth message to PNIP 2028-1, and so on. In a first in list approach, all messages are routed to PNIP 2028-1; if it is not available for a given message, the message is routed to PNIP 2028-2; if PNIP 2028-2 is not available, the message is routed to PNIP 2028-3; if PNIP 2028-3 is not available, the message is routed to 2028-4. Each PNIP 2028-1 through 2028-4 in FIG. 6 could be a single machine or a group of machines addressed by first in list or round robin as discussed just above. In one or more embodiments, the physical network 2026 between PNIPs 2012, 2024 and the physical network 2030, 2032 between PNIPs 2012, 2024 and the central site 2009 is a private Multiprotocol Label Switching (MPLS) TCP/IP network and is not the Internet. Once the issuer's network group address has been determined by the PNIP 2012 (or ASP 2050), the message is routed to the issuer PNIP 2024. Once the 0100 auth message arrives at the issuer PNIP 2024, additional edits are performed to double check and make sure that the message has been routed to the correct location. Furthermore, the member ID is examined, because some issuers may share a single PNIP and it is necessary to determine which of the issuers (members) sharing that PNIP the transaction in question is to be routed to. Each of the issuers sharing the PNIP will have its own port on the member side of the PNIP; the transaction is routed to the appropriate port based on the member parameters. See FIG. 7 where a generalized PNIP 2028 has a network side 2034 and a member side 2036. Member side 2036 has N ports 2038-1 through 2038-N to members 1 to N. N is used herein as a generalized arbitrary integer and the value of N in FIG. 9 is not necessarily the same as that of N in connection with elements 2002 in FIG. 2, for example.

Figure 8:
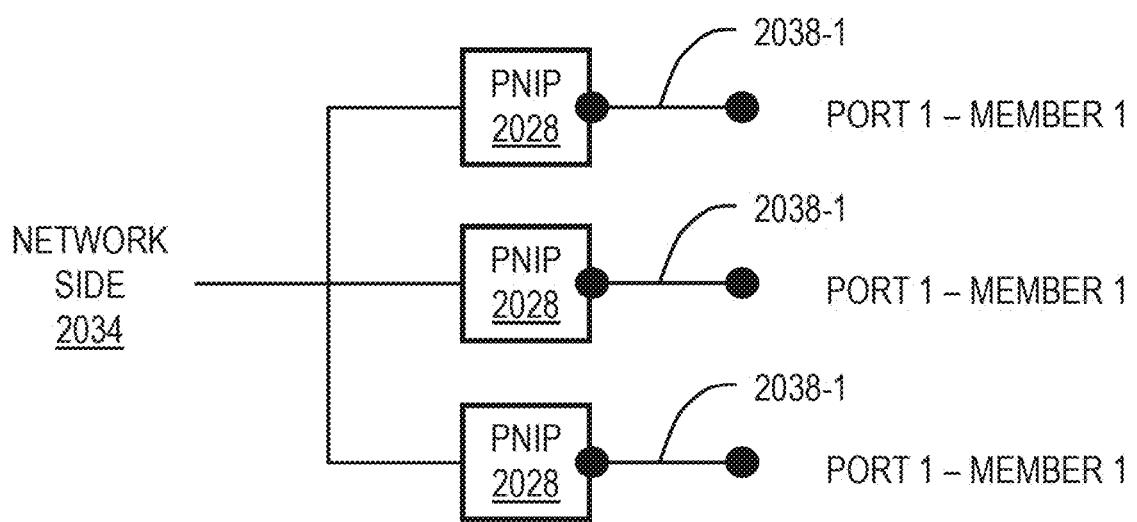
FIG. 8 shows a case wherein an issuer has multiple payment network interface processors.

As seen in FIG. 8, in some instances, an issuer has multiple PNIP devices 2028 at a single site, with a network-side connection 2034, and with multiple PNIPs 2028 all connected to the same host system (each has port 1 2038-1 associated with the same member (issuer)).

At this point, the 0100 message has been delivered to the issuer 2010. The issuer 2010 then carries out issuer processing and decisioning (e.g., with issuer processing platform 2040) based on transaction velocities, open to buy, fraud detection protocols, etc., and provides an appropriate authorization request response, ISO 8583 MTI 0110. There are a number of different possible response codes defined within ISO 8583 and its particular implementations. Each transaction is made up of multiple data elements; the response from the issuer is included in data element 39. Once the 0110 message is received on the issuer PNIP 2024 from platform 2040 it is parsed and edited for format, content, and context, including validation of DE39 to make sure that it is a valid value.

It is worth noting that in one or more instances, at every point where a transaction touches a computer of the payment card network, whether it be an acquirer PNIP 2012, issuer PNIP 2024, or a special services computer or computers 2050 at the central location 2009 (discussed below), transaction context is preserved. That is to say, before the message is sent on to the next node in the network, a copy is saved in a context manager queue 2042, 2046, 2058, so that when the transaction response MTI 0110 comes back through, the request MTI 0100 can be matched with the response, in order to know how to route the response back to the previous route point. One of the items saved in the context manager queue is the message originator's address, so that it can be used for route-back information. Once the issuer PNIP validation is complete, including format, content, and context edits, the transaction is extracted from the context manager queue 2046 and the route-back address is retrieved, and the 0110 message is then sent back where it came from; in this case, the acquirer PNIP 2012 (or ASP 2050). The acquirer PNIP 2012 then receives and parses the message and pulls its original request out of its context manager queue 2042. Note that multiple acquirers may share an acquirer PNIP and it is therefore necessary to know which port on the acquirer PNIP to route the response back to (see discussion of FIG. 7). Checking the message against the original request in the context manager queue allows the message to be routed back to the correct port.

Each PNIP 2012, 2024 typically has many different programs. These can include, for example, a parser/editor 2020, 2043; a parameter file manager; a transaction context manager; a member communications program; a network communications program; and the like. Please note that to reduce clutter, FIGS. 4 and 5 show "MPS extract" 2022, 2044; this will typically include the extract itself and the associated parameter file manager which manages obtaining the extracts from MPS 2018. Similarly, to reduce clutter, FIGS. 4 and 5 show "context manager queue" 2042, 2046; this will typically include the queue itself and the associated manager which manages the contents of the queue. In one or more embodiments, there is also a communication program used to communicate between the other programs (inter-process communications) on the PNIP; this is omitted from FIGS. 4 and 5 to avoid clutter.

Messages in case of Enhanced Services: In one or more instances, a special architecture is used to facilitate delivery of enhanced services (the ASP 2050 in FIGS. 4 and 5 is a non-limiting example). Examples of enhanced services include the MasterCard "inControl" product providing spending controls and/or virtual card numbers. Other examples are loyalty rewards, recurring payment cancellations, and the like. One or more instances do not deploy this complex logic out to the network edge. Furthermore in this regard, the issuer and acquirer PNIPs 2012, 2024 are referred to as being on the edge because they reside on the customer's premises 2006, 2010. There may be over 2000 PNIPs on a typical network. The special architecture used in one or more instances is a central site type architecture associated with location 2009. At the central site 2009, certain computers are referred to as authorization services processors or ASPs 2050.

On the acquirer PNIP 2012, when checking the member parameter file for an account range, determine whether the transaction requires enhanced services. If yes, the transaction is routed to the central site ASPs 2050, which have interfaces to all of the service provider systems—the ASPs do not necessarily provide the services themselves (although they can in some embodiments), but may mediate between the network (e.g., BANKNET) and the actual service providers 2051-1 through 2051-N. An ASP will typically have connections 2053 to a mainframe 2052 via DB2 connect or other suitable connection. If a transaction is to be enriched with additional data, a database call will be made to the mainframe 2052 to retrieve the information from mainframe database 2054 so that it can be inserted into the transaction before the transaction is forwarded to the issuers. Interfaces can also be provided to a risk management system, a decisioning management system, IN CONTROL, rewards, and the like. Service providers 2051-1 through 2051-N generally represent any enhanced services, non-limiting examples of which have been given herein.

A communications layer 2056 is used to communicate with the service providers in one or more embodiments, a non-limiting example of a suitable implementation is the IBM MQ series. The 0100 message may be sent to the service providers, optionally encapsulated inside a special "enhanced services" (ES) header that wraps the message with any additional information required to fulfill the service. The service provider sends a response. The ASP takes the response and enriches the 0100 transaction with the service response, and then sends the entire package on to the issuer PNIP 2024. Some enhanced services are processed on the request messages (0100) and others are processed on the response messages (0110). Once the response message is processed on the ASP, the original message will be pulled from the context manager queue 2058 on the ASP to determine the appropriate acquirer PNIP 2012 to route the message back to. From there, the acquirer PNIP will behave just as in the "Messages routed directly to the issuer PNIP" case discussed above. Some embodiments of the special architecture use an Enterprise Service Bus to mediate and facilitate some of the services 2051. For example, the In CONTROL service can be accessed via an instance of an Enterprise Service Bus.

Entry of Data into the Data Warehouse: In one or more instances, every transaction that flows through the issuer PNIP 2012, acquirer PNIP 2024, and/or ASPs 2050 is logged at every point by writing log records. Multiple times a day (e.g., six), a global file transfer system 2059 pulls the logs off each node and collects them into a support files system 2060 on the mainframe 2052. The log files are parsed and collected into a general daily file. The general daily file is scrubbed and modified to create a consolidated file on the mainframe which is then pulled into the data warehouse 2062, where additional data manipulation and scrubbing are performed before the transactions are stored. The data warehouse 2062 is located at an intermediate node (location 2009) connected to the PNIPs of the acquirers and issuers 2012, 2024. By way of clarification, in one or more embodiments, the node 2009 is directly connected to the PNIPs 2012, 2024 but the data warehouse is not directly connected to the 2012 and 2024 devices; rather, data flows through GFT and SF systems 2059, 2060 and ends up in the data warehouse. Data warehouse 2062 should be distinguished from a data warehouse 154 that might be maintained by an issuer.

Clearing and Settlement: One or more instances employ a clearing and settlement system 2074. In clearing, via global file transfer 2059, acquirers submit clearing files in an appropriate message format (in a non-limiting example, Integrated Product Messages (IPM) format). The files contain, from the acquirers' perspective, what they believe they should be paid for. In one or more instances, the authorization does not actually move any money; the authorization only validates that the cardholder is a valid cardholder recognized by the bank, which will honor payment to the merchant for the goods or services. For example, in a typical restaurant visit, the card is swiped for the receipt amount but then a tip is added. The clearing message will have the actual food amount plus the tip. In one or more instances, the clearing does not actually move the money; it merely resolves the actual amounts. The settlement system actually initiates movement of the money. Furthermore in this regard, the settlement system actually tells the banks how much money to move but does not actually move the money. Within clearing, processes include dispute resolution, chargeback, and the like. During clearing, files are sent from the acquirers to the payment card network; the payment card network, using clearing and settlement system 2074, then takes the files and splits them and sorts them by issuer. Response files are then received from each issuer, and these response files are again split and re-sorted back to the correct acquirers. Eventually, data flows into the settlement system and money is moved. Thus, at a high level, the auth request and auth request response are in real time, and the clearing and settlement are in a batch mode.

By way of review and provision of additional detail, in at least some instances, in a batch mode, clearing is initiated via an ISO 8583 MTI 1240 message having a DE24 function code value of 200 for a first presentment. Once this message is obtained from the acquirer, the payment card network, using clearing and settlement system 2074, will undertake syntax edits, format edits, content edits, and context edits (typically applied to every transaction). If those edits are passed, the interchange and fees associated with the transaction will be calculated. Based on the calculations, the message may also be enriched with additional information before being passed on to the issuer. The settlement amount is then determined. Within the clearing cycle, the amounts of money due to each given member (e.g., issuer or acquirer) are accumulated, and these are summed up into a settlement file which is forwarded in due course.

Cryptographic aspects: Consider the concepts of data at rest and data in motion. An example of data at rest is the log files that actually reside on the PNIPS themselves—configuration information containing card numbers or personally identifiable information (PII). In one or more embodiments, all sensitive data at rest is encrypted before being written to disk. Data in motion refers to data actually moving over a transmission medium (e.g., wires, coaxial cable, fiber optic cable, RF link). All PCI-sensitive data (PCI Security Standards Council, LLC, Wakefield, Mass. US) is encrypted, whether written to disk or being sent over a network. In at least some instances, internal links within the premises of the acquirers and issuers are not encrypted since it is assumed that the customer premises are a physically secure facility relying on physical security of the hardware. On the other hand, in at least some instances, external links (e.g., links 2026, 2030 and 2032) are all encrypted for both authorization traffic and bulk file transfers.

One or more embodiments will have interface(s) 2068 to other brands of payment card processing network. For example, a MASTERCARD branded payment card processing network may have interfaces to networks such as AMERICAN EXPRESS, VISA, JCB, DISCOVER, and the like. Suitable translation layers can be provided to intermediate between MASTERCARD (or other) format and formats used by other networks, as appropriate. In one or more embodiments, interfaces 2068 to other payment networks are provided via a machine, located at 2009, but generally analogous to an Issuer PNIP 2024 with added mediation layers loaded as required by other payment network formats. Some merchants may only have a single interface to, e.g., the MASTERCARD network—all transactions from that merchant may be routed to MASTERCARD, regardless of what card was used—MASTERCARD will process those transactions and route them out to the appropriate networks.

While payment card networks have generally been used as described with regard to FIGS. 1 and 2, recently, MasterCard MONEYSEND (mark of MasterCard International Incorporated, Purchase, N.Y., US) money transfer services have provided a new dimension. A funding transaction moves money from the sender (customer) to the Originating Institution (the financial institution providing the money transfer service); that transaction can be initiated through a MONEYSEND application program interface (API). The sender can fund the transaction using a MasterCard card account or other branded card account that the Originating Institution accepts; from a bank account; or with cash. A Payment Transaction transfers funds from the Originating Institution, via the MasterCard Network (e.g., BANKNET), to the payment card account identified by the recipient at the Receiving Institution. Funds can be transferred to a MasterCard® card, Debit MasterCard® card, and the like (marks of MasterCard International Incorporated, Purchase, N.Y., US). Such transactions are a non-limiting example of what can be more generally referred to as special payment transactions.

Exemplary Mobile Device

FIG. 9 is a block diagram of an exemplary tablet computing device, netbook, "Ultrabook" or other subnotebook, laptop, mobile electronic device, or smart phone 800 or the like. Unit 800 includes a suitable processor; e.g., a microprocessor 802. A cellular transceiver module 804 coupled to processor 802 includes an antenna and appropriate circuitry to send and receive cellular telephone signals, e.g., 3G or 4G. In some cases, a Wi-Fi transceiver module 806 coupled to processor 802 includes an antenna and appropriate circuitry to allow unit 800 to connect to the Internet via a wireless network access point or hotspot. The skilled artisan will appreciate that "Wi-Fi" is a trademark of the Wi-Fi Alliance and the brand name for products using the IEEE 802.11 family of standards. In some cases, a Bluetooth transceiver module 829 coupled to processor 802 includes an antenna and appropriate circuitry to allow unit 800 to connect to other devices via the Bluetooth wireless technology standard. In some cases, an NFC transceiver module 831 coupled to processor 802 includes an antenna and appropriate circuitry to allow unit 800 to establish radio communication via near-field communications.

Operating system (OS) 827 orchestrates the operation of unit 800. Apple's iOS and Google's Android are non-limiting examples of suitable operating systems.

Touch screen 810 coupled to processor 802 is also generally indicative of a variety of input/output (I/O) devices such as a keypad, another type of display, a mouse or other pointing device, and so on, all of which may or may not be present in one or more embodiments. Audio module 818 coupled to processor 802 includes, for example, an audio coder/decoder (codec), speaker, headphone jack, microphone, and so on. In some instances, a vibrating buzzer 895 is provided (e.g., a small electric motor connected to an off-center weight)—the vibrating buzzer 895 and audio module 818 can be thought of as part of a generalized notification system (not separately labeled) which can communicate with a user of the phone 800 via haptic techniques or otherwise. Power management system 816 can include a battery charger, an interface to a battery, and so on. Memory 812 is coupled to processor 802. Memory 812 can include, for example, volatile memory such as RAM, and non-volatile memory such as ROM, flash, or any tangible computer-readable recordable storage medium which stores information in a non-transitory manner. Processor 802 will typically also have on-chip memory.

In some instances, touch screen 810 may be capable of integration with a device having haptic capabilities (e.g. haptic glove 893), such as described below, and unit 800 may correspond to client device 1003 and/or standalone device 1103, both discussed below.

In some cases, fingerprint scanner 837 is coupled to processor 802 for biometric authentication purposes. An appropriate corresponding software application (not separately depicted) may reside in memory 812 in some instances. A digital camera 839 is coupled to processor 802. Camera 839 can optionally be used in conjunction with a facial recognition application 835 in memory 812 for biometric verification. A microphone in audio module 818 can optionally be used in conjunction with a speaker recognition application 833 in memory 812 for biometric verification; a suitable acoustic front end can be provided.

A GPS receiver module 899 coupled to processor 802 includes an antenna and appropriate circuitry to allow device 800 to calculate its position by precisely timing the signals sent by GPS satellites high above the Earth. Corresponding software resides in memory 812.

Memory 812 can also include, for example, a stored PIN for comparison with a PIN entered via touch screen 810; extracted facial features from the legitimate owner of the phone for comparison with facial features extracted from a picture taken by camera 839; extracted fingerprint features from the legitimate owner of the phone for comparison with fingerprint features obtained from a scan carried out by scanner 837; and/or extracted voice features from the legitimate owner of the phone for comparison with voice features extracted from a voice sample obtained from a microphone in audio module 818. Note that elements in FIG. 9 are shown connected directly to processor 802; however, one or more bus structures can be employed in one or more embodiments. Furthermore, elements shown as implemented in software may be implemented at least in part in hardware for speed, if desired.

Browser program 897 in memory 812 deciphers hypertext markup language (html) served out by a server such as system 500 (discussed below) for display on screen 810 or the like.

Application (mobile app) 845 in memory 812 can represent a variety of applications that communicate with a back-end server (e.g., 500, 1009) and render information to the user. Information can be rendered to the user, for example, by browser 897 or by a native app on the phone. Aspects of the invention can be employed to address similar issues in either case; namely, to combat attempted mimicking of a human. For example, a bot trying to buy tickets on a ticket sales web site might be more likely to successfully purchase than a human. For security purposes, in one or more embodiments, a haptic glove 893 linked to the phone 800, regardless of whether a native app 845 or browser 897 is being used, allows a human user to respond to a haptic stimulus that cannot be perceived by an automated "bot" to verify that the putative user is in fact a human. In some instances, instead of a haptic glove, already-present resources on the phone are utilized; e.g., the phone is made to vibrate in a certain way via buzzer 895; say, 3 buzzes in a row, the human responds to the web site and says he or she felt three vibrations, thus proving that he or she is a human and not a bot.

One or more embodiments tie into the OS 827 of the phone to cause buzzes/vibrations or other haptic stimulus. A "bot" would not be aware of this but an actual human person can feel the stimulus (unless the bot is able to hack the OS signals to the buzzer 895). Some embodiments vibrate a predetermined pattern; e.g., dot-dot-dash and ask the putative human user how many dots and/or how many dashes. A native app 845 will have permission to access that part of the OS 827 of the phone to be able to initiate vibrations. As used herein, a "native application" ("native app") is an application program that has been developed for use on a particular platform or device. Because native apps are written for a specific platform, they can interact with, and take advantage of, operating system features and other software that is typically installed on that platform. The manufacturer of phone 800 or a related party will typically publish a specification for application developers to describe how to access the buzzer 895 or other salient features. Non-limiting examples of native apps include those which the phone provider loads on the phone or those which the phone owner voluntarily chooses to download from an appropriate source. One non-limiting example is a social networking app—prior to installation, it will ask many questions as it installs; e.g., for the user's contact list, permission to access the phone vibration notification system, and the like . . . the phone owner typically approves this because he or she trusts the app (downloaded from a trusted source). As part of this process, the user might be prompted and advised that in order to extend a "Friend" request, he or she must prove that he or she is human. Then, when that time comes, the app asks the user (e.g.) how many short vibrations he or she feels. App 845 on phone 800 has the feature built in, in this aspect. This aspect could be employed instead of or in addition to a so-called reCAPTCHA, to prove that the putative human user is not a robot, e.g., user required to choose image of bird in photo or the like.

Every instance need not necessarily have every feature depicted in FIG. 9.

Aspects of Haptic Feedback as a Method of Authentication and the Like

One or more embodiments provide techniques utilizing haptic feedback as a method of authentication. Consider the "CAPTCHA" process where an individual proves that he or she is not a "BOT" by typing in displayed distorted text not amenable to machine reading; e.g., a distorted street sign. In one or more embodiments, an individual is presented with a grid with grid locations having different haptic characteristics and is asked to identify, e.g., the grid portion(s) that contain(s) a certain vibration or pressure pattern.

Shared secret or second factor authentication can also be employed in some instances. For example, on ANDROID devices the user can set up a 9-dot grid pattern. By moving in a predetermined manner across the grid, the user unlocks the phone, possibly in connection with some other factor. This aspect is a variation of proving that a putative human user is not a bot—rather, the individual proves that he or she is who he or she says he or she is—an authentication rule. For example, the user sets the pattern originally; if someone knows the code, assume it is the user. Suppose the authentication rule is three long vibrations—two short vibrations—one long vibration. Suppose the 9-box grid pattern includes no visual indicia but as the user moves over it the haptic glove and/or the buzzer 895 gives the user a certain vibration or pressure pattern—the user is instructed to press down when he or she feels three long vibrations, then two short vibrations, then one long vibration. In an alternative aspect, the rule could just set "vibration" and the user moves his or her finger over the 9-box grid till he or she feels vibrations and then presses the corresponding button, but does not press for buttons/grid locations with no vibrations. In a non-limiting example, this approach could be used instead of or in addition to the PIN for chip and PIN transactions—the user might enter three or four vibration or pressure patterns.

Examples of suitable virtual reality gloves include the Manus VR Glove, which is a high-end data glove that brings intuitive interaction to virtual reality, and is available from Manus VR, Eindhoven, Netherlands; and the "VRgluv" virtual reality glove available from VRgluv, LLC, Atlanta, Ga., USA. In some cases, tactile feedback can be employed with a smart phone (e.g. 800) or other device by providing a sense of pressure or vibration on the user's hand as he or she navigates around a screen (e.g. touch screen 810) or augmented reality (AR) environment or virtual reality (VR) environment. In this aspect, the user wears a haptic glove 893 with an open fingertip or with a special fingertip that works with the touch screen, generally represented as 889. For example, one or more fingertips of the haptic glove, or even the entire glove, can be made from a special conductive micro-fiber woven into a glove liner, to bridge the conductive gap gloves create between the user and his or her device. The user's location on the screen 810 is sensed based on his or her fingertip, in the usual manner, and conveyed to the device driver 891 and/or other pertinent components for control of the haptic glove. 889

Some embodiments, as just noted, employ a haptic glove 893 with a finger cutout or special material 889. As seen in FIG. 9, a "Bluetooth" or other wireless or hard-wired interface is provided between the device with the grid pattern (e.g. screen 810) and the haptic glove. A point-of-sale (POS) terminal could be hard-wired, for example. Embodiments could employ, for example, a 9- or 12-box grid; one example could be to set it so that the desired pattern is 3 buzzes followed by two buzzes followed by one buzz. As the user moves over the grid he or she feels vibrations; for example, in a diagonal. This aspect enhances security—fixed numerical patterns according to the prior art can be detected by fingerprints. In contrast, in one or more embodiments, a fixed pattern is not employed. Rather, the user seeks a vibration pattern. He or she moves his or her finger until he or she finds the 3-2-1 pattern. While perhaps slower than prior-art systems, this aspect is believed to be more secure. Embodiments are not limited to use with a phone—aspects could be applied to a door, e.g. In one or more embodiments, every time the user seeks to gain access, the vibrations/buzzes are laid out in a different pattern.

In another aspect, the haptic pattern could also be shared with another party. This aspect is, in some cases, somewhat analogous to sharing a secret key in encryption. User A sends User B an encrypted document, and instead of being required to enter a password, User A sends User B, via app, the vibration pattern that will unlock that document. Even if intercepted by a third party or automated bot, a human is still needed to unlock the document because only a human can sense the vibration pattern. While this aspect may not be completely secure against nefarious humans, it nevertheless limits the possibility of bots intercepting documents and opening them. In some cases, send the recipient, for example, an image suggestive of a certain vibration or pressure pattern and then the recipient looks for that pattern to unlock the document. Thus, two factors are needed to "crack" the document—(i) recipient must recognize that it is an image of suggestive of a certain vibration or pressure pattern AND (ii) recipient must be able to recognize that pattern with a haptic device. For example, an image of a low frequency sine wave could suggest a low frequency vibration while an image of a high frequency sine wave could suggest a high frequency vibration. In another example, an image of a vise could suggest a "strong" pressure while an image of a feather could suggest a "gentle" pressure.

Exemplary applications of one or more embodiments include (i) confirming that a computing device is interacting with a human and not a "BOT"; and (ii) confirming that a user is on a legitimate web site—for the visually impaired or otherwise—by presenting a predetermined haptic pattern. In some instances, a party such as a bank gives the user pre-arranged haptic feedback (shared secret) to confirm that the user is on the legitimate web site, before he or she enters credentials, transfers funds, or carries out other activities with potential security implications.

A user may interact locally with his or her device, or may interact, via his or her device, with a remote server with authentication materials stored thereon.

Referring again to FIG. 9, in some embodiments, a haptic glove 893 or the like is coupled to phone 800 via Bluetooth interface 829 or another wireless interface (some devices can be hard wired to the haptic glove instead). A device driver 891 for glove 893 is in memory 812. One or more embodiments employ app 845 and/or browser 897, together with vibration source 895, glove 893 being optional (to provide pressure, e.g.). Bluetooth or other wireless or wired interfacing is provided as appropriate to allow haptic glove 893 to communicate with the display of 810 of the tablet, phone, laptop, or desktop. One or more embodiments provide a representation of a grid on screen 810; the grid may optionally include images which represent pressure or vibration patterns. Bluetooth or other communication is provided to permit communication with the device driver 891. The device driver knows the user's position on the grid and what vibrations/pressures/sensations to deliver. The device driver 891 signals the glove 893 and the glove interprets the signals as strong pressure, gentle pressure, and so on.

A pattern can be formed by the user's movement over the grid to indicate, for example, where he or she felt certain vibration(s) and/or pressure(s); or the user uses his or her finger to tap a touchscreen device e.g. phone, tablet, or the like to indicate/acknowledge that the appropriate vibration/buzzing was felt in a certain spot. In one or more embodiments, a suitable back end (e.g. servers 500/1009 to which client 800 is connected via a wireless network) then interprets the user's input. Several approaches are possible. In one aspect, a binary approach is taken—the user must answer all aspects of the challenge correctly; otherwise no access is granted. Alternatively, a "fuzzy" scoring process can be employed—say, if 3 of 4 vibrations/pressures are correctly identified or better, grant access (otherwise do not).

Figure 3:
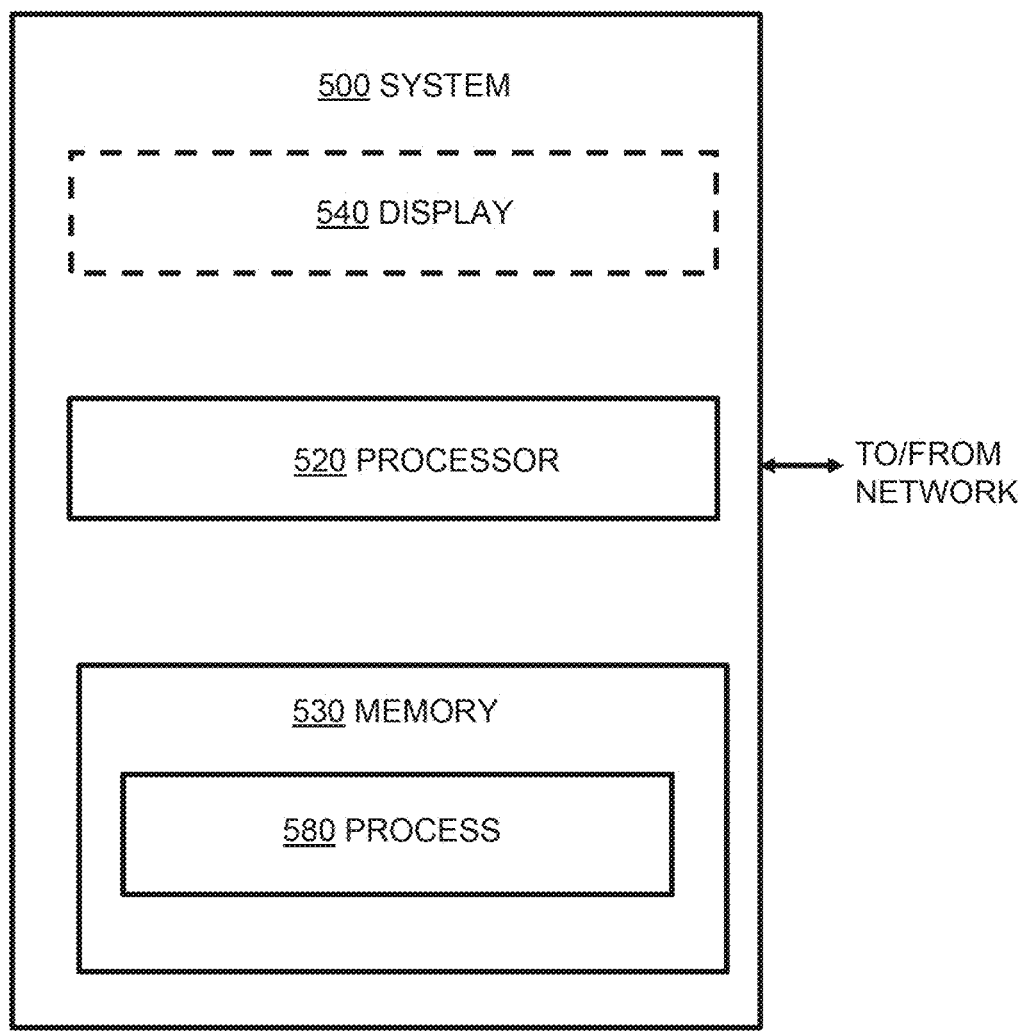
FIG. 3 is a block diagram of an exemplary computer system useful in one or more embodiments of the invention.

It should be noted that one or more embodiments are not limited to mobile devices such as 800 (e.g. smart phone, tablet) but are also applicable in a desktop environment with universal serial bus or other wired interface (or Bluetooth or other wireless interface), audio system, optional haptic glove or the like. Note that FIG. 3 is generally representative of a server as well as a desktop or laptop client; furthermore, the details provided with respect to FIG. 9 are also generally representative of a desktop/laptop approach; the haptic glove, a mouse, etc. could be used as a pointing device instead of the touch screen.

Recapitulation

Figure 10A:
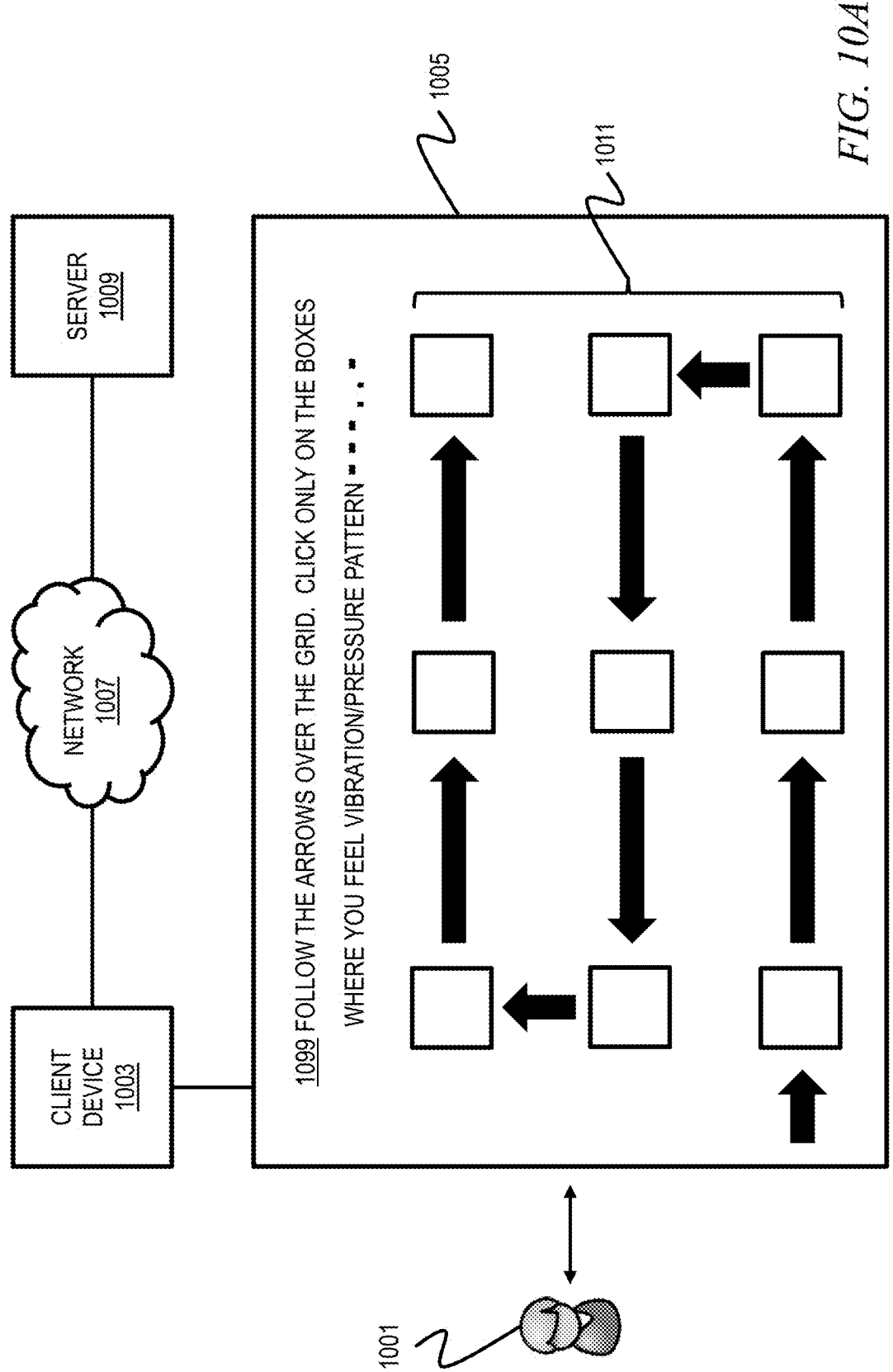
FIGS. 10A and 10B (collectively, FIG. 10) depict a client-server arrangement useful in connection with haptic authentication, according to an aspect of the invention.

Given the discussion thus far, and referring to FIGS. 10 and 11, it will be appreciated that, in general terms, an exemplary method includes obtaining an indication of interaction of a putative human user 1001, 1101 with a computing device such as a client device 1003 in a client-server arrangement or standalone device 1103. A further step includes, responsive to the indication, facilitating presentation (e.g., on screen 1005, 1105) to the putative human user 1001, 1101 of a haptic pattern not amenable to machine perception. In the examples of FIGS. 10A and 11A, the user is prompted at 1099, 1199 to follow the arrows over the 3×3 grid 1011, 1111 and to click only on those grid locations with a vibration or pressure pattern of LONG-LONG-LONG-SHORT-SHORT-LONG (this being an exemplary haptic pattern not amenable to machine perception). Suppose that the lower left-hand grid point, middle grid point in the upper row, and middle grid point in the middle row all have that pattern, while the other grid points have no vibration/pressure or a different vibration/pressure pattern. The user first moves the pointing device to the lower left-had grid point, feels the indicated vibration/pressure pattern, and then clicks. The user next moves to the middle grid point of the lower row, right-hand grid point of the lower row, right-hand grid point of the middle row, does not feel the indicated LONG-LONG-LONG-SHORT-SHORT-LONG pattern, and does not click. When the user next moves to the middle grid point in the middle row, he or she feels the indicated LONG-LONG-LONG-SHORT-SHORT-LONG pattern and clicks. The user next moves to the left-hand grid point of the middle row, and left-hand grid point of the upper row, does not feel the indicated LONG-LONG-LONG-SHORT-SHORT-LONG pattern, and does not click. When the user next moves to the middle grid point in the upper row, he or she feels the indicated LONG-LONG-LONG-SHORT-SHORT-LONG pattern and clicks. Finally, the user next moves to the right-hand grid point of the upper row, does not feel the indicated LONG-LONG-LONG-SHORT-SHORT-LONG pattern, and does not click.

The user can navigate, for example, using his or her finger on a touch screen. Vibrations can be provided, for example, by buzzer 895. Pressure can be provided, for example, by haptic glove 893. In some instances, the haptic glove is also a pointer. In some instances, the haptic glove is used in conjunction with a touch screen and has a cutout finger and/or fingertip with special conductive material, as at 889. The pointing device could thus be the haptic glove itself, a mouse, a trackball, a touch screen, or the like.

In the client-server arrangement of FIG. 10, the indication of interaction could be, for example, a request by the putative human user 1001 to access a given uniform resource locator (URL) from server 1009 over network 1007 via client device 1003.

A further step includes facilitating the putative human user 1001, 1101 being prompted to input information indicative of human perception of the pattern (by user 1001, 1101). As noted, in the examples of FIGS. 10A and 11A, the user is prompted at 1099, 1199 to follow the arrows over the 3×3 grid 1011, 1111 and to click only on those grid locations with the displayed vibration or pressure pattern. Suppose that the lower left-hand grid point, middle grid point in the upper row, and middle grid point in the middle row all have that pattern, while the other grid points have no vibration/pressure or a different vibration/pressure pattern. The user first moves the pointing device to the lower left-had grid point, feels the indicated vibration/pressure pattern, and then clicks. The user next moves to the middle grid point of the lower row, right-hand grid point of the lower row, right-hand grid point of the middle row, does not feel the indicated LONG-LONG-LONG-SHORT-SHORT-LONG pattern, and does not click. When the user next moves to the middle grid point in the middle row, he or she feels the indicated LONG-LONG-LONG-SHORT-SHORT-LONG pattern and clicks. The user next moves to the left-hand grid point of the middle row, and left-hand grid point of the upper row, does not feel the indicated LONG-LONG-LONG-SHORT-SHORT-LONG pattern, and does not click. When the user next moves to the middle grid point in the upper row, he or she feels the indicated LONG-LONG-LONG-SHORT-SHORT-LONG pattern and clicks. Finally, the user next moves to the right-hand grid point of the upper row, does not feel the indicated LONG-LONG-LONG-SHORT-SHORT-LONG pattern, and does not click.

An even further step includes obtaining information input by the putative human user 1001, 1101 responsive to the prompting (i.e., the pattern of clicks/no clicks is obtained at the device driver for the pointing device).

The user could be prompted by, for example, audio instead of or in addition to via, display, etc. to traverse the grid and click on the appropriate locations. In another aspect, there could be two or more haptic patterns; for example, low frequency and high frequency. The user could be instructed, for example, to single-click low frequency and double click high frequency.

A still further step includes, when the information input by the putative human user indicates that the putative human user is an actual human user, permitting the interaction to continue. For example, in the client-server architecture, the permitting may include permitting the putative human user to access the given uniform resource locator (URL) from server 1009 over network 1007 via client 1003.

In some instances, the haptic pattern is a vibration pattern; and the step of obtaining the information includes obtaining an indication that the putative human user perceives the vibration pattern.

For example, the facilitating of the putative human user being prompted to input the information indicative of human perception of the vibration pattern can include facilitating the putative human user being prompted to use a finger to traverse a touch screen in a grid pattern, and to click the touch screen with the finger when a given grid of the grid pattern corresponds to the vibration pattern, but to refrain from clicking the touch screen with the finger when another given grid of the grid pattern does not correspond to the vibration pattern. Obtaining the indication that the putative human user perceives the vibration pattern then includes a fuzzy or exact match from the user input. For example, the user may be required to correctly click on all the matching grid points and to refrain from clicking on all the non-matching grid points, or some percentage wrong may be tolerated; e.g., allow missing one match and/or misidentifying one non match as a match.

Figure 10B:
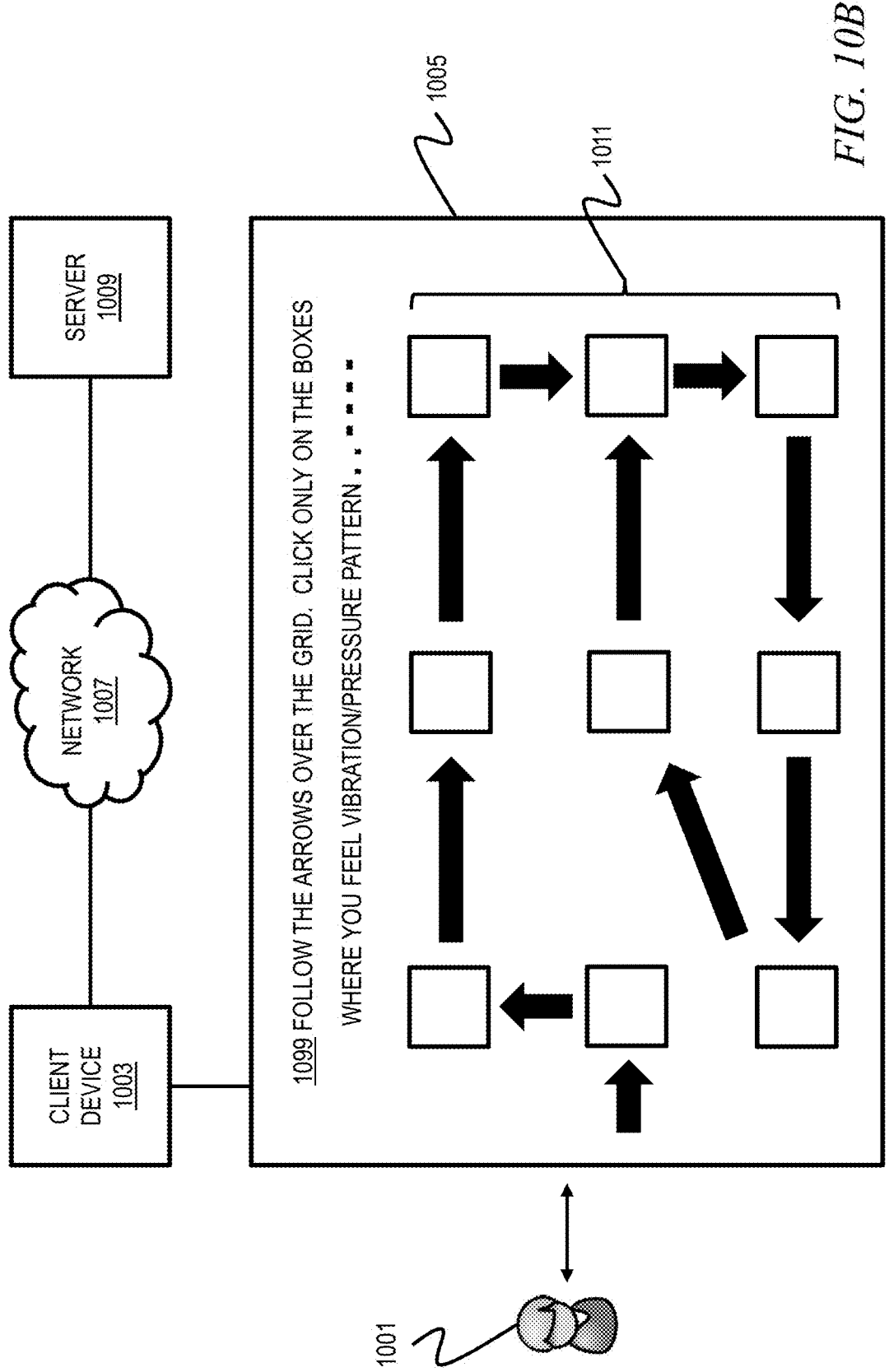
Figure 11B:
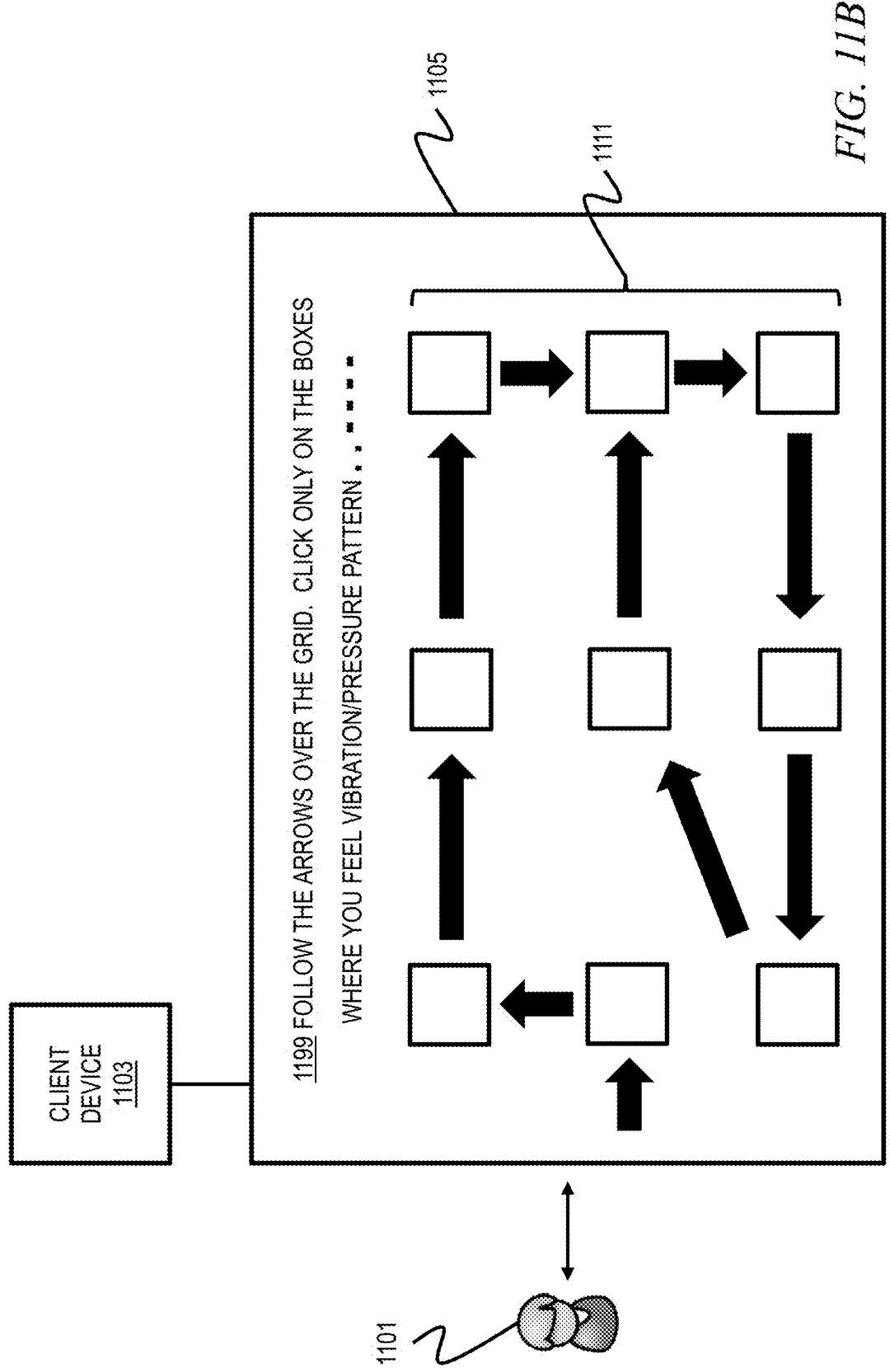

Referring to FIGS. 10B and 11B, for added security, e.g., the vibration pattern and/or the traversal path for the grid pattern can be changed for subsequent interactions of subsequent putative human users with the computing device. As seen in FIGS. 10B and 11B, the vibration pattern is changed from LONG-LONG-LONG-SHORT-SHORT-LONG to SHORT-SHORT-LONG-LONG-LONG-LONG, and the traversal path is changed as indicated by the different pattern of block arrows. The grid locations with matching patterns could also be changed; for example, the three left-hand boxes could match and none of the middle or right-hand column boxes. Elements in FIGS. 10B and 11B with the same numbers as those in FIGS. 10A and 11A are similar.

In some instances, the haptic pattern includes a pressure pattern; and the step of obtaining the information includes obtaining an indication that the putative human user perceives the pressure pattern.

For example, the facilitating of the putative human user being prompted to input the information indicative of human perception of the pressure pattern includes facilitating the putative human user being prompted to use a pointing device to traverse a grid pattern, and to click the pointing device when a given grid of the grid pattern corresponds to the pressure pattern, but to refrain from clicking the pointing device when another given grid of the grid pattern does not correspond to the pressure pattern. Fuzzy or exact matching could be employed as described above.

For added security, e.g., the pressure pattern and/or the traversal path for the grid pattern can be changed for subsequent interactions of subsequent putative human users with the computing device, analogously to the above-described changing for the vibration pattern.

Vibration and pressure patterns are non-limiting examples of haptic patterns; any type of haptic pattern now available for reproduction, or becoming available in the future, could be employed; e.g., rough versus smooth surfaces.

From the point of view of the server 1009 in the client-server arrangement of FIG. 10, the computing device is the remote client 1003; the obtaining of the indication of interaction includes obtaining the indication from the remote client 1003 at server 1009 (e.g. over network 1007); and the facilitating of the presentation of the pattern includes dispatching (e.g. over network 1007) from the server 1009 to the remote client 1003 hypertext markup language configured to cause the remote client to present the pattern (e.g. on haptic screen 1005).

Furthermore, the facilitating of the putative human user 1011 being prompted to input information indicative of human perception of the pattern includes dispatching from the server 1009 to the remote client 1003 (e.g. over network 1007) hypertext markup language configured to cause the remote client 1003 to prompt the putative human user. The obtaining of the information input by the putative human user includes obtaining the information from the remote client 1003 at the server 1009 (e.g., over network 1007); and the permitting the interaction to continue includes sending to the remote client 1003 from the server 1009 (e.g., over network 1007) material requested by the remote client.

Network 1007 can be any kind of suitable individual network or a network of networks such as that commonly known as the Internet.

From the point of view of the client 1003 in the client-server arrangement of FIG. 10, the computing device is client 1003; the obtaining of the indication of interaction includes obtaining the indication at the client; and the facilitating of the presentation of the pattern includes executing, in a browser of the client, hypertext markup language configured to cause the remote client to present the pattern.

Furthermore, the facilitating of the putative human user 1001 being prompted to input information indicative of human perception of the pattern includes executing, in the browser of the client, hypertext markup language configured to cause the remote client to prompt the putative human user; the obtaining of the information input by the putative human user includes obtaining the information at the client; and the permitting the interaction to continue includes displaying on the client material requested by the client from a server (e.g., the html corresponding to the URL that was requested is served out once the user is verified to be a human).

A native application on the client may be involved, in addition to, or in lieu of, the browser on the client. For example, a native application of the client can be configured to present the pattern and/or to prompt the putative human user.

In the case of the stand-alone device 1103, the obtaining of the indication of interaction includes obtaining the indication at the computing device 1103; the facilitating of the presentation of the pattern includes presenting the pattern at the computing device 1103; and the facilitating of the putative human user 1101 being prompted to input information indicative of human perception of the pattern includes prompting the putative human user at the computing device. The obtaining of the information input by the putative human user includes obtaining the information at the computing device 1103. Permitting the interaction to continue can include whatever subsequent interactions are appropriate in the given context.

Some embodiments can be used to deliberately slow down people's interactions with web sites; for example, when one or a few users are "hogging" resources.

It will be appreciated that the "stand-alone" device 1103 may have a network connection and may even function as a client and/or server for other purposes; the terminology "stand-alone" device merely means that a client-server architecture is not used for the haptic process of verifying that the user is a human, as described.

Furthermore, given the discussion thus far, and referring again to FIG. 10, it will be appreciated that, in general terms, another exemplary method includes, during user registration of a user 1001 for a web site associated with an expected host server (e.g. hosted on server 1009), indicating to the user 1001 a predetermined haptic pattern which will be presented to the user during future access to the web site. Embodiments are applicable any kind of web site vulnerable to spoofing and/or phishing; e-commerce web sites are a non-limiting example. A further step includes, during the future access to the web site, presenting the predetermined haptic pattern to the user, so that the user can verify that the pattern matches the indication from the registration and can have confidence that the web pages he or she is interacting with were sourced from the expected host server. An even further step includes, subsequent to the presenting of the predetermined pattern to the user, the expected host server interacting with the user to facilitate an online transaction. The transaction is not limited to e-commerce; it could also involve, for example, querying a database or the like.

The terminology "expected host server" is not intended to imply that the user necessarily has technical knowledge of the host server, its Internet address; etc.; rather, the user is interacting with a "legitimate" web site; if he or she thinks she is carrying out a banking transaction on the site of Bank A, the server is legitimately operated by or on behalf of Bank A and is not a malware/phishing site.

Thus, the aspect just described involves a shared secret; for example, presenting a user with a pressure and/or vibration pattern he or she preselected.

Figure 12:
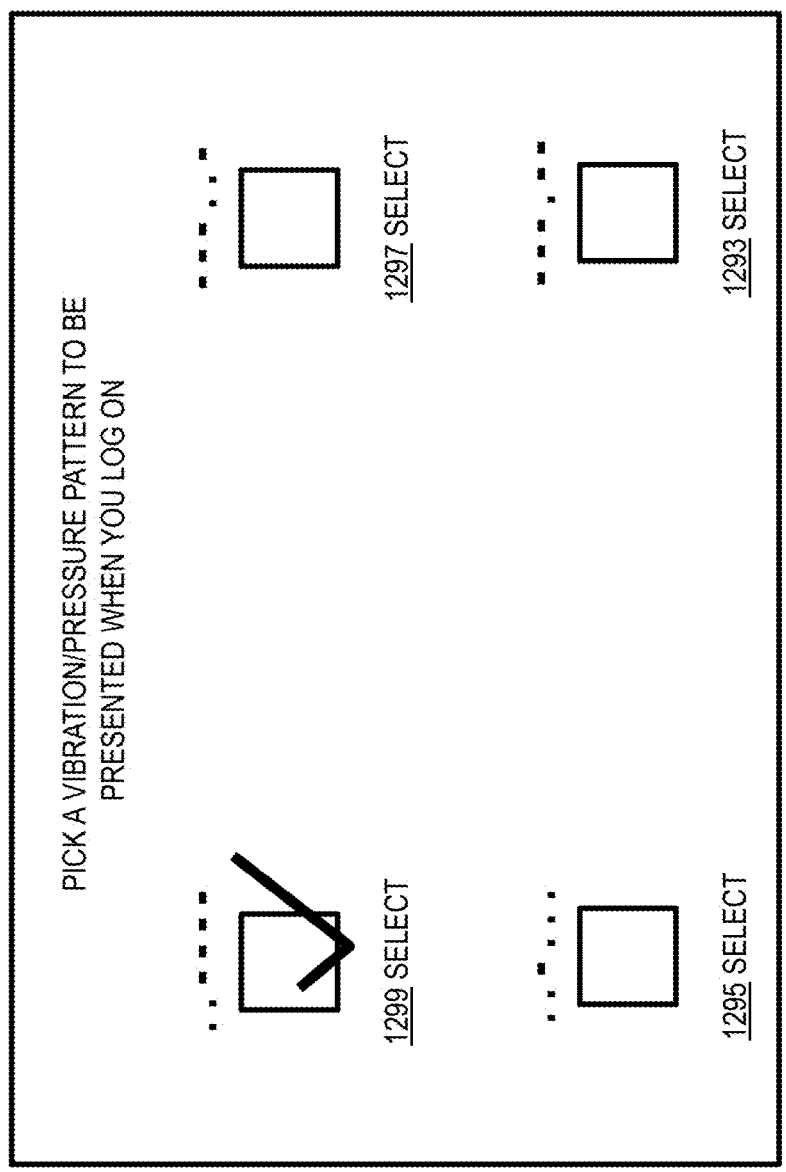
FIG. 12 depicts user selection of a haptic pattern, according to an aspect of the invention.
Figure 13:
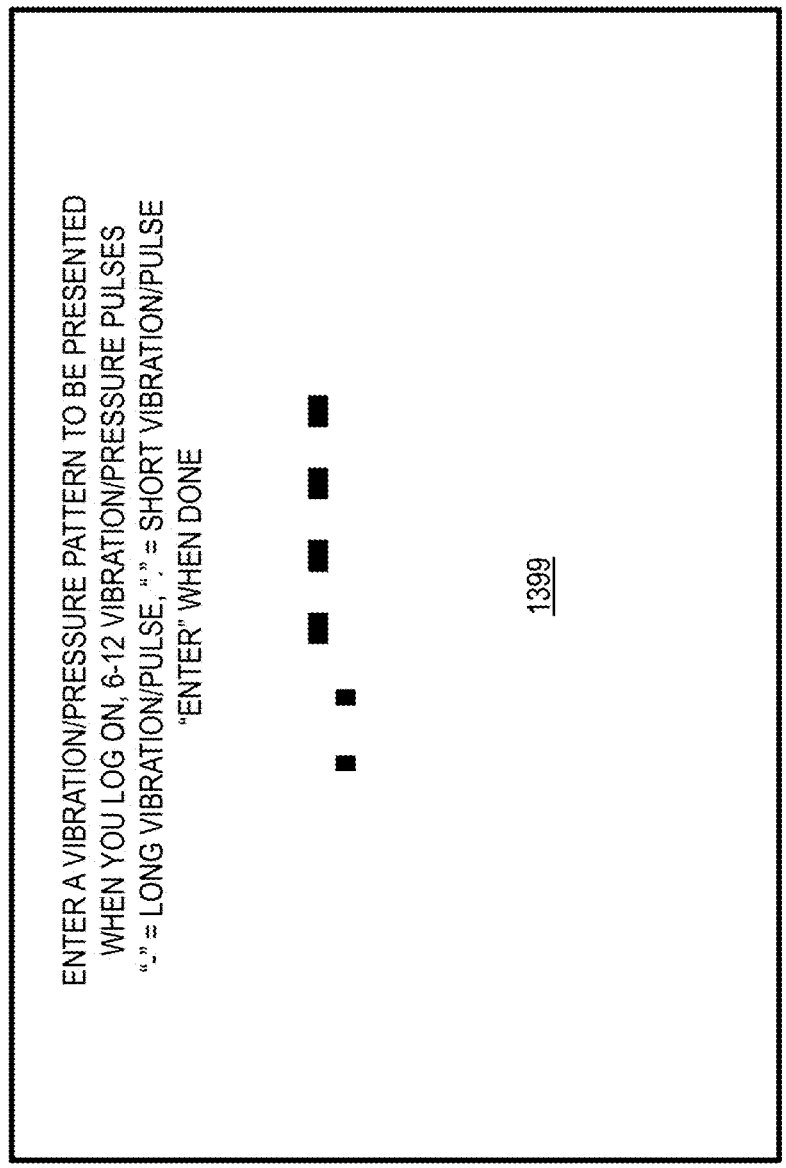
FIG. 13 depicts user definition of a haptic pattern, according to an aspect of the invention.

Referring to FIGS. 12 and 13, in some instances, a further step includes, during the user registration, affording the user an opportunity to select the predetermined haptic pattern 1011; the indication of the predetermined pattern to the user is then responsive to the selecting by the user. For example, as shown in FIG. 12, the user may be offered various patterns 1299, 1297, 1295, 1293 and may select, for example, pattern 1299. In another aspect, as shown in FIG. 13, the user is permitted to define a desired pattern. Here, as seen at 1399, the user enters 6-12 pulses of vibration or pressure, as the case may be, as either "short" (".") or "long" ("-") (similar to Morse code), pressing "enter" when complete.

Where the user does not select his or her own pattern, a pattern may be assigned to him or her at registration.

In some cases, the haptic pattern is a vibration pattern, and the step of presenting the predetermined haptic pattern to the user includes causing a vibrating alert buzzer 895 of a device of the user to vibrate in the predetermined haptic pattern.

In some instances, the haptic pattern is a pressure pattern, and the step of presenting the predetermined haptic pattern to the user includes causing a peripheral haptic glove 893 of a device of the user to apply pressure to a hand of the user in the predetermined haptic pattern.

From the standpoint of server 1009, during the user registration, indicating the predetermined haptic pattern to the user includes dispatching from the expected host server 1009 to remote client 1003 (e.g. via network 1007) hypertext markup language configured to cause the remote client to present the predetermined pattern 1011 (e.g. on screen 1005). During the future access, presenting of the predetermined haptic pattern 1011 also includes dispatching, from the expected host server to the remote client, hypertext markup language configured to cause the remote client to present the predetermined haptic pattern. The expected host server interacts with the user, subsequent to presenting the predetermined pattern to the user, by the expected host server interacting with the remote client.

From the standpoint of client 1003, during the user registration, indicating the predetermined pattern to the user includes presenting the pattern at client 1003. During the future access, presenting of the predetermined pattern also includes presenting the pattern at the client. Said expected host server interacts with the user subsequent to the presenting of the predetermined pattern to the user via client 1003 interacting with the expected host server 1009 (e.g. via network 1007).

As noted, one or more embodiments can be employed for access control. Thus, it will be appreciated that, in general terms, yet another exemplary method, according to yet another aspect of the invention, includes pre-establishing a shared secret with an authorized person for control of access to a resource. The shared secret includes a haptic pattern. This could be done in a manner similar to FIGS. 12 and 13, except the user is required to remember the pattern, he or she is not prompted with it when seeking access. A further step includes obtaining an indication of a person purporting to be the authorized person attempting to access the resource (e.g., person navigates to secure URL). Still a further step includes, responsive to the indication, facilitating the person purporting to be the authorized person being prompted to input, to a processor (E.G. 520, 802), information indicating that the person purporting to be the authorized person is in possession of the shared secret. Responsive to the prompting, input is obtained from the person purporting to be the authorized person. For example, the person is prompted as in FIGS. 10A-11B except that the pattern is not displayed, e.g., "FOLLOW THE ARROWS OVER THE GRID. CLICK ONLY ON THE BOXES WHERE YOU FEEL YOUR SECRET VIBRATION/PRESSURE PATTERN."

When the input from the person purporting to be the authorized person indicates that the person purporting to be the authorized person is in possession of the shared secret, the person purporting to be the authorized person is permitted to access the resource. Fuzzy or exact matching could be used as described above.

Non-limiting examples of resources include computing resources, electronic documents, physical facilities behind a door or gate, and the like.

In some instances, the haptic pattern is a vibration pattern; and, in the step of obtaining the input, the input indicates that the person purporting to be the authorized person knows the vibration pattern.

In some cases, facilitating of the person purporting to be the authorized person being prompted to input to a processor information indicating that the person purporting to be the authorized person is in possession of the shared secret includes facilitating the person purporting to be the authorized person being prompted to use a finger to traverse a touch screen in a grid pattern, and to click the touch screen with the finger when a given grid of the grid pattern corresponds to the vibration pattern, but to refrain from clicking the touch screen with the finger when another given grid of the grid pattern does not correspond to the vibration pattern.

The vibration pattern and/or a traversal path for the grid pattern can be changed for subsequent attempts of subsequent putative human users to access the resource (similar to FIGS. 10B and 11B).

In some instances, the haptic pattern is a pressure pattern; and, in the step of obtaining the input, the input indicates that the person purporting to be the authorized person knows the pressure pattern.

In some cases, facilitating of the person purporting to be the authorized person being prompted to input to a processor information indicating that the person purporting to be the authorized person is in possession of the shared secret includes facilitating the person purporting to be the authorized person being prompted to use a pointing device to traverse a grid pattern, and to click the pointing device when a given grid of the grid pattern corresponds to the pressure pattern, but to refrain from clicking the pointing device when another given grid of the grid pattern does not correspond to the pressure pattern.

The pressure pattern and/or a traversal path for the grid pattern can be changed for subsequent attempts of subsequent putative human users to access the resource (similar to FIGS. 10B and 11B).

Also contemplated are systems and/or apparatuses as disclosed herein. For example, an apparatus could include a memory 812 or 530 (discussed below); and at least one processor 802 or 520 (discussed below), coupled to the memory, and operative to carry out any one, some, or all of the method steps descried herein. In some instances, the apparatus also includes a haptic-enabled peripheral device (e.g., 893) coupled to the rules engine; for example, via Bluetooth 829 and with a suitable device driver 891 as described. A touch screen or the like may have an appropriate screen driver or the like to integrate with the glove.

For the avoidance of doubt, references to "MasterCard," "an entity such as MasterCard International Incorporated," and the like, unless expressly stated to be limited to MasterCard, are intended to be exemplary of an operator of a payment card network, as will be appreciated by the skilled artisan from the context, whether or not qualified by words such as "or other operator."

It is worth noting again that one or more embodiments are not limited to authentication for e-commerce. For example, some embodiments pertain to access to a members-only area on a web site or in a game; access to a sensitive database, or the like.

System and Article of Manufacture Details

Embodiments of the invention can employ hardware and/or hardware and software aspects. Software includes but is not limited to firmware, resident software, microcode, etc.

Software might be employed, for example, in connection with one or more modules to implement at least a portion of one or more of the elements of the systems and/or flows of FIGS. 9-13; a terminal 122, 124, 125, 126; a reader 132; a host, server, and/or processing center 140, 142, 144 (optionally with data warehouse 154) of a merchant, issuer, acquirer, processor, other third party, or operator of a network 2008; and the like. Firmware might be employed, for example, in connection with payment devices such as cards 102, 112, as well as reader 132.

FIG. 3 is a block diagram of a system 500 that can implement part or all of one or more aspects or processes of the invention. As shown in FIG. 3, memory 530 configures the processor 520 (which could correspond, e.g., to processor portions 106, 116, 130; a processor of a terminal or a reader 132; processors of remote hosts in centers 140, 142, 144; processors of a merchant, issuer, acquirer, processor, other third party, or operator of a network 2008 and/or systems and/or flows of FIGS. 9-13, and the like); to implement one or more aspects of the methods, steps, and functions disclosed herein (collectively, shown as process 580 in FIG. 3). Different method steps can be performed by different processors. The memory 530 could be distributed or local and the processor 520 could be distributed or singular. The memory 530 could be implemented as an electrical, magnetic or optical memory, or any combination of these or other types of storage devices (including memory portions as described above with respect to cards 102, 112). It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an application specific integrated circuit (ASIC) or field programmable gate array (FPGA) rather than using firmware. Display 540 is representative of a variety of possible input/output devices (e.g., displays, printers, keyboards, mice, touch screens, touch pads, and so on).

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is defined to encompass a recordable medium (non-transitory storage), examples of which are set forth above, but does not encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on one, some, or all of elements 122, 124, 125, 126, 140, 142, 144, 2004, 2006, 2008, 2010; on a computer implementing aspects of network 2008 and/or systems and/or flows of FIGS. 9-13; on processors of hosts and/or servers of other parties described herein; and the like. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 122, 124, 125, 126, 140, 142, 144, 2004, 2006, 2008, 2010; a computer implementing aspects of network 2008 and/or systems and/or flows of FIGS. 9-13; hosts and/or servers of other parties described herein; and the like, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program product comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 500 as shown in FIG. 3) running a server program. It will be understood that such a physical server may or may not include a display, keyboard, or other input/output components. A "host" includes a physical data processing system (for example, system 500 as shown in FIG. 3) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the software-implementable components shown in the figures. The method steps can be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Thus, aspects of the invention can be implemented, for example, by one or more appropriately programmed general purpose computers, such as, for example, servers, mobile devices, or personal computers, located at one or more of the entities in the figures, as well as within the payment network 2008 and/or systems and/or flows of FIGS. 9-13. Such computers can be interconnected, for example, by one or more of payment network 2008, another VPN, the Internet, a local area and/or wide area network (LAN and/or WAN), via an EDI layer, and so on. Note that element 2008 represents both the network and its operator. The computers can be programmed, for example, in compiled, interpreted, object-oriented, assembly, and/or machine languages, for example, one or more of C, C++, Java, Visual Basic, COBOL, Assembler, Structured Query Language (SQL), and the like (an exemplary and non-limiting list), and can also make use of, for example, Extensible Markup Language (XML), known application programs such as relational database applications (e.g., IBM DB2® software available from International Business Machines Corporation, Armonk, N.Y., US; SAS® software available from SAS Institute, Inc., Cary, N.C., US), spreadsheets (e.g., MICROSOFT EXCEL® software available from Microsoft Corporation, Redmond, Wash., US), and the like. The computers can be programmed to implement the logic and/or data flow depicted in the figures. In some instances, messaging and the like may be in accordance with the International Organization for Standardization (ISO) Specification 8583 *Financial transaction card originated messages— Interchange message specifications* and/or the ISO 20022 or UNIFI Standard for Financial Services Messaging, also incorporated herein by reference in its entirety for all purposes. In one or more embodiments, some messages may be in accordance with NACHA Automated Clearing House (ACH) rules and regulations.

Although illustrative embodiments of the invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   obtaining an indication of interaction of a putative human user with a computing device;
   responsive to said indication, facilitating presentation to said putative human user of a haptic pattern not amenable to machine perception, each element of the haptic pattern corresponding to a grid portion of a visual display;
   facilitating said putative human user being prompted to input information indicative of human perception of said pattern, the information identifying one or more grid portions of the visual display that correspond to each element of the haptic pattern;
   obtaining information input by said putative human user responsive to said prompting; and
   when said information input by said putative human user indicates that said putative human user is an actual human user, permitting said interaction to continue, wherein:
   said haptic pattern comprises a vibration pattern;
   said step of obtaining said information comprises obtaining an indication that said putative human user perceives said vibration pattern; and
   said facilitating of said putative human user being prompted to input said information indicative of human perception of said vibration pattern comprises facilitating said putative human user being prompted to use a finger to traverse a touch screen in a grid pattern, and to click said touch screen with said finger when a given grid of said grid pattern while being touched by said authorized person corresponds to said vibration pattern, but to refrain from clicking said touch screen with said finger when a not her given grid of said grid pattern while being touched by said authorized person does not correspond to said vibration pattern.

2. The method of claim 1, further comprising changing at least one of (i) said vibration pattern; and (ii) a traversal path for said grid pattern, for subsequent interactions of subsequent putative human users with said computing device.

3. The method of claim 1, wherein:
   said haptic pattern comprises a pressure pattern; and
   said step of obtaining said information comprises obtaining an indication that said putative human user perceives said pressure pattern.

4. The method of claim 3, wherein:
   said facilitating of said putative human user being prompted to input said information indicative of human perception of said pressure pattern comprises facilitating said putative human user being prompted to use a pointing device to traverse a pressure grid pattern, and to click said pointing device when a given pressure grid of said pressure grid pattern corresponds to said pressure pattern, but to refrain from clicking said pointing device when another given pressure grid of said pressure grid pattern does not correspond to said pressure pattern.

5. The method of claim 4, further comprising changing at least one of (i) said pressure pattern; and (ii) a traversal path for said pressure grid pattern, for subsequent interactions of subsequent putative human users with said computing device.

6. The method of claim 1, wherein:
   said indication of interaction comprises a request by said putative human user to access a given uniform resource locator (URL); and
   said permitting comprises permitting said putative human user to access said given uniform resource locator (URL).

7. The method of claim 1, wherein:
   said computing device comprises a remote client;
   said obtaining of said indication of interaction comprises obtaining said indication from said remote client at a server;
   said facilitating of said presentation of said pattern comprises dispatching from said server to said remote client hypertext markup language configured to cause said remote client to present said pattern;
   said facilitating of said putative human user being prompted to input information indicative of human perception of said pattern comprises dispatching from said server to said remote client hypertext markup language configured to cause said remote client to prompt said putative human user;
   said obtaining of said information input by said putative human user comprises obtaining said information from said remote client at said server; and
   said permitting said interaction to continue comprises sending to said remote client from said server material requested by said remote client.

8. The method of claim 1, wherein:
   said computing device comprises a client;
   said obtaining of said indication of interaction comprises obtaining said indication at said client;
   said facilitating of said presentation of said pattern comprises executing in a browser of said client hypertext markup language configured to cause said client to present said pattern;
   said facilitating of said putative human user being prompted to input information indicative of human perception of said pattern comprises executing in said browser of said client hypertext markup language configured to cause said client to prompt said putative human user;

said obtaining of said information input by said putative human user comprises obtaining said information at said client; and said permitting said interaction to continue comprises displaying on said client material requested by said client from a server.

9. The method of claim 1, wherein:

said computing device comprises a client;

said obtaining of said indication of interaction comprises obtaining said indication at said client;

said facilitating of said presentation of said pattern comprises executing a native application of said client configured to cause said client to present said pattern;

said facilitating of said putative human user being prompted to input information indicative of human perception of said pattern comprises executing said native application to cause said client to prompt said putative human user;

said obtaining of said information input by said putative human user comprises obtaining said information at said client; and said permitting said interaction to continue comprises displaying on said client material requested by said client from a server.

10. The method of claim 1, wherein:

said obtaining of said indication of interaction comprises obtaining said indication at said computing device;

said facilitating of said presentation of said pattern comprises presenting said pattern at said computing device;

said facilitating of said putative human user being prompted to input information indicative of human perception of said pattern comprises prompting said putative human user at said computing device; and said obtaining of said information input by said putative human user comprises obtaining said information at said computing device.

11. A method comprising:

pre-establishing a shared secret with an authorized person for control of access to a resource, said shared secret comprising a haptic pattern, each element of the haptic pattern corresponding to a grid portion of a visual display;

obtaining an indication of a person purporting to be said authorized person attempting to access said resource;

responsive to said indication, facilitating said person purporting to be said authorized person being prompted to input to a processor information indicating that said person purporting to be said authorized person is in possession of said shared secret;

obtaining input from said person purporting to be said authorized person responsive to said prompting, the input identifying one or more grid portions of the visual display that correspond to each element of the haptic pattern; and when said input from said person purporting to be said authorized person indicates that said person purporting to be said authorized person is in possession of said shared secret, permitting said person purporting to be said authorized person to access said resource; wherein:

said haptic pattern comprises a vibration pattern; and in said step of obtaining said input, said input indicates that said person purporting to be said authorized person knows said vibration pattern; and said facilitating of said person purporting to be said authorized person being prompted to input to a processor information indicating that said person purporting to be said authorized person is in possession of said shared secret comprises facilitating said person purporting to be said authorized person being prompted to use a finger to traverse a touch screen in a grid pattern, and to click said touch screen with said finger when a given grid of said grid pattern while being touched by said authorized person corresponds to said vibration pattern, but to refrain from clicking said touch screen with said finger when a not her given grid of said grid pattern while being touched by said authorized person does not correspond to said vibration pattern.

12. The method of claim 11, further comprising changing at least one of (i) said vibration pattern; and (ii) a traversal path for said grid pattern, for subsequent attempts of subsequent putative human users to access said resource.

13. The method of claim 11, wherein:

said haptic pattern comprises a pressure pattern; and in said step of obtaining said input, said input indicates that said person purporting to be said authorized person knows said pressure pattern.

14. The method of claim 13, wherein:

said facilitating of said person purporting to be said authorized person being prompted to input to a processor information indicating that said person purporting to be said authorized person is in possession of said shared secret comprises facilitating said person purporting to be said authorized person being prompted to use a pointing device to traverse a pressure grid pattern, and to click said pointing device when a given pressure grid of said pressure grid pattern corresponds to said pressure pattern, but to refrain from clicking said pointing device when another given pressure grid of said pressure grid pattern does not correspond to said pressure pattern.

15. The method of claim 14, further comprising changing at least one of (i) said pressure pattern; and (ii) a traversal path for said pressure grid pattern, for subsequent attempts of subsequent putative human users to access said resource.

16. An apparatus comprising:

a memory; and at least one processor, coupled to said memory, and operative to:

obtain an indication of interaction of a putative human user with a computing device;

responsive to said indication, facilitate presentation to said putative human user of a haptic pattern not amenable to machine perception, each element of the haptic pattern corresponding to a grid portion of a visual display;

facilitate said putative human user being prompted to input information indicative of human perception of said pattern;

obtain information input by said putative human user responsive to said prompting, the information identifying one or more grid portions of the visual display that correspond to each element of the haptic pattern; and when said information input by said putative human user indicates that said putative human user is an actual human user, permitting said interaction to continue; wherein:

said haptic pattern comprises a vibration pattern;

said step of obtaining said information comprises obtaining an indication that said putative human user perceives said vibration pattern; and said facilitating of said putative human user being prompted to input said information indicative of human perception of said vibration pattern comprises facilitating said putative human user being prompted to use a finger to traverse a touch screen in a grid pattern, and to click said touch screen with said finger when a given grid of said grid pattern while being touched by said authorized person corresponds to said vibration pattern, but to refrain from clicking said touch screen with said finger when a not her given grid of said grid pattern while being touched by said authorized person does not correspond to said vibration pattern.

* * * * *